(12) United States Patent
Yonemoto et al.

(10) Patent No.: US 10,393,926 B2
(45) Date of Patent: Aug. 27, 2019

(54) OPTICAL CONVERSION MEMBER, METHOD FOR MANUFACTURING OPTICAL CONVERSION MEMBER, BACKLIGHT UNIT INCLUDING OPTICAL CONVERSION MEMBER, AND LIQUID CRYSTAL DISPLAY DEVICE

(71) Applicant: FUJIFILM Corporation, Tokyo (JP)

(72) Inventors: Takashi Yonemoto, Kanagawa (JP); Yukito Saitoh, Kanagawa (JP); Megumi Sekiguchi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 264 days.

(21) Appl. No.: 15/278,552

(22) Filed: Sep. 28, 2016

(65) Prior Publication Data

US 2017/0017022 A1 Jan. 19, 2017

Related U.S. Application Data

(63) Continuation of application No. PCT/JP2015/059844, filed on Mar. 30, 2015.

(30) Foreign Application Priority Data

Mar. 31, 2014 (JP) ................................. 2014-072034

(51) Int. Cl.
*G02F 1/1335* (2006.01)
*G02B 5/02* (2006.01)
(Continued)

(52) U.S. Cl.
CPC ........... *G02B 5/0242* (2013.01); *G02B 6/005* (2013.01); *G02B 6/0051* (2013.01);
(Continued)

(58) Field of Classification Search
None
See application file for complete search history.

(56) References Cited

U.S. PATENT DOCUMENTS

| 8,770,773 B2 | 7/2014 | Yoshida et al. |
| 2010/0315320 A1 | 12/2010 | Yoshida |
| 2012/0113672 A1 | 5/2012 | Dubrow et al. |

FOREIGN PATENT DOCUMENTS

| JP | 2008-102169 A | 5/2008 |
| JP | 2008-239755 A | 10/2008 |

(Continued)

OTHER PUBLICATIONS

International Preliminary Report on Patentability issued by WIPO dated Oct. 13, 2016, in connection with International Patent Application No. PCT/JP2015/059844.

(Continued)

*Primary Examiner* — Richard H Kim
(74) *Attorney, Agent, or Firm* — Edwards Neils LLC; Jean C. Edwards, Esq.

(57) ABSTRACT

Disclosed is an optical conversion member, including an optical conversion layer containing quantum dot emitting fluorescent light and an anisotropic light scattering layer having I (0°)/I (40°) of 3 or greater, in which I (0°) indicates a transmission light intensity of the anisotropic light scattering layer at the time of allowing light to be incident on the anisotropic light scattering layer from a normal direction of a surface of the anisotropic light scattering layer, and I (40°) indicates a transmission light intensity of the anisotropic light scattering layer in an azimuth in which a transmission light intensity of the anisotropic light scattering layer at the time of allowing light to be incident on the anisotropic light scattering layer from a direction of a tilt angle of 40° with respect to the normal direction of the surface of the anisotropic light scattering layer becomes a minimum value.

20 Claims, 5 Drawing Sheets

(51) Int. Cl.
*G02F 1/13357* (2006.01)
*F21V 8/00* (2006.01)

(52) U.S. Cl.
CPC ............... *G02F 1/1336* (2013.01); *G02F 2001/133614* (2013.01); *G02F 2202/36* (2013.01)

(56) References Cited

FOREIGN PATENT DOCUMENTS

| | | |
|---|---|---|
| JP | 2009-158462 A | 7/2009 |
| JP | 2010-044320 A | 2/2010 |
| JP | 2011-065804 A | 3/2011 |
| JP | 2013-033833 A | 2/2013 |
| WO | 2013-024558 A1 | 2/2013 |
| WO | 2013/046130 A1 | 4/2013 |

OTHER PUBLICATIONS

International Search Report issued in connection with International Patent Application No. PCT/JP2015/059844 dated May 19, 2015.
Written Opinion issued in connection with International Patent Application No. PCT/JP2015/059844 dated May 19, 2015.
Notification of Reasons for Refusal, issued by the Japanese Patent Office dated Aug. 8, 2017, in connection with Japanese Patent Application No. 2016-511862.

OPTICAL CONVERSION MEMBER, METHOD FOR MANUFACTURING OPTICAL CONVERSION MEMBER, BACKLIGHT UNIT INCLUDING OPTICAL CONVERSION MEMBER, AND LIQUID CRYSTAL DISPLAY DEVICE

CROSS-REFERENCE TO RELATED APPLICATIONS

This application is a Continuation of PCT International Application No. PCT/JP2015/059844, filed on Mar. 30, 2015, which was published under PCT Article 21(2) in Japanese, and which claims priority under 35 U.S.C. Section 119(a) to Japanese Patent Application No. 2014-072034 filed on Mar. 31, 2014. The above applications are hereby expressly incorporated by reference, in their entirety, into the present application.

BACKGROUND OF THE INVENTION

1. Field of the Invention

The present invention relates to an optical conversion member (also referred to as a wavelength conversion member), and specifically, relates to an optical conversion member which contains a quantum dot and has a high light extraction efficiency.

Further, the present invention also relates to a method for manufacturing the optical conversion member, a backlight unit including the optical conversion member, and a liquid crystal display device including the backlight unit.

2. Description of the Related Art

A flat panel display such as a liquid crystal display device (hereinafter, also referred to as LCD) has been widely used annually as a space saving image display device having low power consumption. The liquid crystal display device is configured of at least a backlight and a liquid crystal cell, and typically, includes members such as a backlight side polarizing plate and a visible side polarizing plate.

In the flat panel display market, improvements in color reproducibility have progressed as LCD performance has improved. From this viewpoint, recently, a quantum dot (also referred to as QD) has attracted attention as a light emission material (refer to US2012/0113672A1). For example, in a case where excitation light is incident on an optical conversion member containing a quantum dot from a backlight, the quantum dot is excited and emits fluorescent light. Here, by using quantum dots having different light emission properties, white light is able to be embodied by emitting each bright line light of red light, green light, and blue light (in a case where a red color is R, a green color is G, and a blue color is B, RGB). In particular, recently, many technologies have been proposed in which a blue light emitting diode is used as a light source, and quantum dots emitting red light and green light are used as fluorescent light, and thus, white light is obtained. The fluorescent light due to the quantum dot has a small half-width of a light emission profile, and thus, white light to be obtained has a high brightness and an excellent color reproducibility. According to the progress of three-wavelength light source technology using such a quantum dot, a color reproduction range has widened to 100% from 72% of the current TV standard (Full High Definition (FHD), National Television System Committee (NTSC)) ratio.

As described above, the quantum dot is a useful material which is able to enhance the performance of LCD by improving color reproducibility. However, currently, the quantum dot is not a material which is available at a low price, and thus, a liquid crystal display device using the quantum dot tends to be expensive. For this reason, in order to reduce the costs of the liquid crystal display device, it is desirable that a light emission efficiency increases such that the use amount of the quantum dot is able to be reduced.

Here, a plurality of configurations such as a sheet type optical conversion member and a bar type optical conversion member have been known as an optical conversion member using a quantum dot, and the sheet type optical conversion member is preferably used from the viewpoint of stability of the quantum dot (refer to US2012/0113672A1). In the sheet type optical conversion member, the quantum dot in a matrix emits light and allows total reflection to occur on the interface with the air, and thus, a part of light (a waveguide mode repeating total reflection) is not able to be extracted to the outside. For this reason, in a case of increasing a light emission efficiency of the sheet type optical conversion member, it is necessary to increase not only a light emission intensity of a light emission body, but also a light extraction efficiency by avoiding the waveguide mode repeating the total reflection.

Various methods such as method of performing isotropic light scattering by dispersing spherical particles in an optical conversion layer, a method of performing isotropic light scattering by applying an isotropic light scattering layer in which spherical particles are dispersed onto an optical conversion layer (refer to FIG. 2), and a method of providing a surface structure in which light scattering is able to be performed are disclosed in US2012/0113672A1 as a method of increasing the light extraction efficiency of the sheet-like optical conversion member using the quantum dot.

SUMMARY OF THE INVENTION

However, as a result of studies of the present inventors with respect to the methods disclosed in US2012/0113672A1, it is found that the light extraction efficiency is not sufficiently enhanced, and a further increase in the light extraction efficiency is required.

In addition, various studies have been conducted regarding a method of increasing a light extraction efficiency, in addition to the technical field of the sheet-like optical conversion member using the quantum dot. In particular, similarly, in the organic electroluminescence (EL) element field, there are many cases where an increase in the light extraction efficiency of only 2% to 3% is regarded as great success, and studies for attaining such success have been conducted. However, recently, the method of increasing the light extraction efficiency has stagnated in each technical field.

An object of the present invention is to provide an optical conversion member which contains a quantum dot and has a high light extraction efficiency.

As a result of intensive studies of the present inventors for attaining the object described above, it has been found that in a case where the light scattering of the fluorescent light from the quantum dot is performed by dispersing the particles as disclosed in US2012/0113672A1, a part of light in the waveguide mode repeating the total reflection is able to be extracted by scattering with respect to the front of the optical conversion member (the visible side), but a part of light which is able to be extracted scatters to the back side, and thus, a new problem occurs in which a distance (=an effective length of an optical path) in the matrix that the light scattering to the back side (a side opposite to the visible side) propagates before being extracted. In the field of the optical conversion member containing the quantum dot, an increase in the effective length of the optical path of the fluorescent light causes an increase in re-absorption of the fluorescent light due to the quantum dot, and thus, the light extraction efficiency decreases.

In order to provide an optical conversion member which contains a quantum dot and has a high light extraction efficiency, the present inventors have conducted intensive studies for solving the new problem in which the effective length of the optical path increases according to the light scattering described above. As a result thereof, it has been found that a light extraction efficiency of an optical conversion member containing a quantum dot increases by using an anisotropic light scattering layer, in which a ratio of a transmission light intensity of the optical conversion member in a normal direction and a transmission light intensity of the optical conversion member in an azimuth of a specific polar angle from the normal direction is in a specific range, in the optical conversion member containing the quantum dot, and thus, the present invention has been completed.

The present invention which is specific means for attaining the object described above is as described below.

[1] An optical conversion member, comprising: an optical conversion layer containing at least one type of quantum dot emitting fluorescent light which is excited by incident excitation light; and an anisotropic light scattering layer having I (0°)/I (40°) of greater than or equal to 3, and here, I (0°) indicates a transmission light intensity of the anisotropic light scattering layer at the time of allowing light to be incident on the anisotropic light scattering layer from a normal direction of a surface of the anisotropic light scattering layer, and I (40°) indicates a transmission light intensity of the anisotropic light scattering layer in an azimuth in which a transmission light intensity of the anisotropic light scattering layer at the time of allowing light to be incident on the anisotropic light scattering layer from a direction of a tilt angle of 40° with respect to the normal direction of the surface of the anisotropic light scattering layer becomes a minimum value.

[2] In the optical conversion member according to [1], it is preferable that the optical conversion layer is a laminate which includes at least a layer containing a quantum dot emitting green light and a layer containing a quantum dot emitting red light, and the layer containing the quantum dot emitting red light, the layer containing the quantum dot emitting green light, and the anisotropic light scattering layer are laminated in this order.

[3] In the optical conversion member according to [1], it is preferable that the optical conversion layer is a layer containing a quantum dot emitting green light and a quantum dot emitting red light.

[4] In the optical conversion member according to any one of [1] to [3], it is preferable that the anisotropic light scattering layer is formed by curing a composition containing a photocurable compound by light irradiation from an azimuth of greater than 0° and less than or equal to 60° from the normal direction of the surface of the anisotropic light scattering layer.

[5] In the optical conversion member according to any one of [1] to [3], it is preferable that the anisotropic light scattering layer is formed by curing a composition containing a polymerizable liquid crystal compound by light irradiation.

[6] An optical conversion member, comprising: an anisotropic light scattering layer having I (0°)/I (40°) of greater than or equal to 3, in which the anisotropic light scattering layer contains at least one type of quantum dot emitting fluorescent light which is excited by incident excitation light, and here, I (0°) indicates a transmission light intensity of the anisotropic light scattering layer at the time of allowing light to be incident on the anisotropic light scattering layer from a normal direction of a surface of the anisotropic light scattering layer, and I (40°) indicates a transmission light intensity of the anisotropic light scattering layer in an azimuth in which a transmission light intensity of the anisotropic light scattering layer at the time of allowing light to be incident on the anisotropic light scattering layer from a direction of a tilt angle of 40° with respect to the normal direction of the surface of the anisotropic light scattering layer becomes a minimum value.

[7] In the optical conversion member according to [6], it is preferable that the optical conversion member contains at least a quantum dot emitting green light and a quantum dot emitting red light as the quantum dot.

[8] In the optical conversion member according to [6] or [7], it is preferable that the anisotropic light scattering layer is a layer formed by curing a composition containing a photocurable compound by light irradiation from an azimuth of greater than 0° and less than or equal to 60° from the normal direction of the surface of the anisotropic light scattering layer.

[9] In the optical conversion member according to any one of [1] to [8], it is preferable that I (0°)/I (40°) of the anisotropic light scattering layer is greater than or equal to 5; and here, I (0°) indicates a transmission light intensity of the anisotropic light scattering layer at the time of allowing light to be incident on the anisotropic light scattering layer from a normal direction of a surface of the anisotropic light scattering layer, and I (40°) indicates a transmission light intensity of the anisotropic light scattering layer in an azimuth in which a transmission light intensity of the anisotropic light scattering layer at the time of allowing light to be incident on the anisotropic light scattering layer from a direction of a tilt angle of 40° with respect to the normal direction of the surface of the anisotropic light scattering layer becomes a minimum value.

[10] In the optical conversion member according to any one of [1] to [9], it is preferable that I (0°)/I (40°) of the anisotropic light scattering layer is greater than or equal to 15; and here, I (0°) indicates a transmission light intensity of the anisotropic light scattering layer at the time of allowing light to be incident on the anisotropic light scattering layer from a normal direction of a surface of the anisotropic light scattering layer, and I (40°) indicates a transmission light intensity of the anisotropic light scattering layer in an azimuth in which a transmission light intensity of the anisotropic light scattering layer at the time of allowing light to be incident on the anisotropic light scattering layer from a direction of a tilt angle of 40° with respect to the normal direction of the surface of the anisotropic light scattering layer becomes a minimum value.

[11] A backlight unit, comprising: the optical conversion member according to any one of [1] to [10]; and a light source.

[12] A liquid crystal display device, comprising: the backlight unit according to [11].

[13] A method for manufacturing the optical conversion member according to any one of [1] to [10], comprising: a step of forming the anisotropic light scattering layer by performing photocuring in which a curable compound is subjected to light irradiation.

[14] In the method for manufacturing the optical conversion member according to [13], it is preferable that the step of forming the anisotropic light scattering layer by the photocuring is a step of performing light irradiation with respect to a composition containing a photocurable compound from an azimuth of greater than 0° and less than or equal to 60° from a normal direction of a surface of the anisotropic light scattering layer.

[15] In the method for manufacturing the optical conversion member according to [13], it is preferable that the step of forming the anisotropic light scattering layer by the photocuring is a step of performing light irradiation with respect to a composition containing a polymerizable liquid crystal compound.

According to the present invention, it is possible to provide an optical conversion member which contains a quantum dot and has a high light extraction efficiency. Further, it is possible to provide a backlight unit including the optical conversion member and a liquid crystal display device.

DESCRIPTION OF THE PREFERRED EMBODIMENTS

Figure 1:
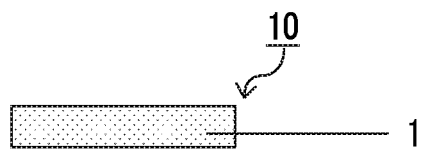
FIG. 1 illustrates an example of an optical conversion member according to one embodiment of the present invention.

Hereinafter, an optical conversion member of the present invention, a method for manufacturing the optical conversion member, a backlight unit, and a liquid crystal display device will be described.

The following description of configuration requirements is based on representative embodiments or specific examples of the present invention, but the present invention is not limited to the embodiments or the specific examples. Furthermore, herein, a numerical range denoted by using "to" indicates a range including numerical values before and after "to" as the lower limit value and the upper limit value.

In addition, in the present invention and herein, a "half-width" of a peak or a profile indicates the width of a peak or a profile at a height of ½ of a peak height or a profile height. In addition, light having a light emission center wavelength in a wavelength range of 40° to 500 nm, and preferably 430 to 480 nm will be referred to as blue light, light having a light emission center wavelength in a wavelength range of 500 to 600 nm will be referred to as green light, and light having a light emission center wavelength in a wavelength range of 600 to 680 nm will be referred to as red light.

[Optical Conversion Member]

An optical conversion member of a first embodiment of the present invention includes an optical conversion layer containing at least one type of quantum dot emitting fluorescent light which is excited by incident excitation light, and an anisotropic light scattering layer having I (0°)/I (40°) of greater than or equal to 3; here, I (0°) indicates a transmission light intensity of the anisotropic light scattering layer at the time of allowing light to be incident on the anisotropic light scattering layer from a normal direction of a surface of the anisotropic light scattering layer, and I (40°) indicates a transmission light intensity of the anisotropic light scattering layer in an azimuth in which a transmission light intensity of the anisotropic light scattering layer at the time of allowing light to be incident on the anisotropic light scattering layer from a direction of a tilt angle of 40° with respect to the normal direction of the surface of the anisotropic light scattering layer becomes a minimum value.

An optical conversion member of a second embodiment of the present invention includes an anisotropic light scattering layer having I (0°)/I (40°) of greater than or equal to 3, and the anisotropic light scattering layer contains at least one type of quantum dot emitting fluorescent light which is excited by incident excitation light; here, I (0°) indicates a transmission light intensity of the anisotropic light scattering layer at the time of allowing light to be incident on the anisotropic light scattering layer from the normal direction of the surface of the anisotropic light scattering layer, and I (40°) indicates a transmission light intensity of the anisotropic light scattering layer in an azimuth in which a transmission light intensity of the anisotropic light scattering layer at the time of allowing light to be incident on the anisotropic light scattering layer from a direction of a tilt angle of 40° with respect to the normal direction of the surface of the anisotropic light scattering layer becomes a minimum value.

Hereinafter, the optical conversion member of the first embodiment of the present invention and the optical conversion member of the second embodiment of the present invention will be collectively referred to as an optical conversion member of the present invention.

According to such configurations, the optical conversion member of the present invention is an optical conversion member which contains a quantum dot and has a high light extraction efficiency. A specific anisotropic light scattering layer is disposed in the optical conversion member on an exit side, and thus, it is possible to increase a light extraction efficiency. The optical conversion member of the present invention is obtained by applying a layer which is transparent with respect to light vertical to the normal direction of the optical conversion member, that is, the interface, and is opaque at an angle of greater than a threshold value (the anisotropic light scattering layer) to a quantum dot sheet. In a case where the threshold value is 40° which is approximately coincident with the total reflection angle, light at an incidence angle of greater than or equal to the total reflection angle scatters, the extraction of light in a waveguide mode is realized, and light in the total reflection angle is transmitted, and thus, an effective length of an optical path is able to be shortened, and a light extraction efficiency is improved. Furthermore, the total reflection angle on the air interface is determined by the refractive index of a resin which is used in the anisotropic light scattering layer or the optical conversion layer containing at least one type of quantum dot as a binder or the like, and the refractive index of the air. In general, in a case where the total reflection angle on the interface between a resin film having a refractive index N and the air is θ1, θ1 becomes θ1=arcsin(1/N). For example, in a case of a PET film having a refractive index of 1.6, the total reflection angle is 39 [deg].

<Configuration>

Figure 3:
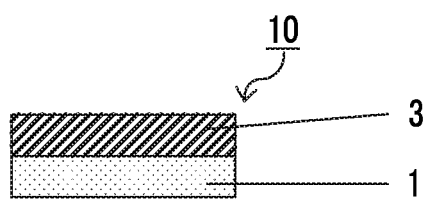
FIG. 3 illustrates an example of the optical conversion member according to one embodiment of the present invention.

As illustrated in FIG. 3, the optical conversion member of the present invention may be an optical conversion member 10 of the first embodiment which is a laminate of an optical conversion layer 1 and an anisotropic light scattering layer 3, and as illustrated in FIG. 1, the optical conversion member of the present invention may be an optical conversion member 10 of the second embodiment which includes an anisotropic light scattering layer 4 containing a quantum dot.

(Optical Conversion Member of First Embodiment)

The optical conversion member of the first embodiment of the present invention includes an optical conversion layer containing at least one type of quantum dot emitting fluorescent light which is excited by incident excitation light, and an anisotropic light scattering layer having I (0°)/I (40°) of greater than or equal to 3; here, I (0°) indicates a transmission light intensity of the anisotropic light scattering layer at the time of allowing light to be incident on the anisotropic light scattering layer from the normal direction of the surface of the anisotropic light scattering layer, and I (40°) indicates a transmission light intensity of the anisotropic light scattering layer in an azimuth in which a transmission light intensity of the anisotropic light scattering layer at the time of allowing light to be incident on the anisotropic light scattering layer from a direction of a tilt angle of 40° with respect to the normal direction of the surface of the anisotropic light scattering layer becomes a minimum value.

In the optical conversion member of the first embodiment of the present invention, the configuration of the optical conversion layer is not particularly limited, may be a single layer, or may be a laminate of two or more layers (for example, layers containing quantum dots). In a case where the optical conversion layer is a laminate of two or more layers, two layers may be arranged to be directly in contact with each other, or two layers may be arranged through an adhesive or a pressure sensitive adhesive layer.

Figure 12:
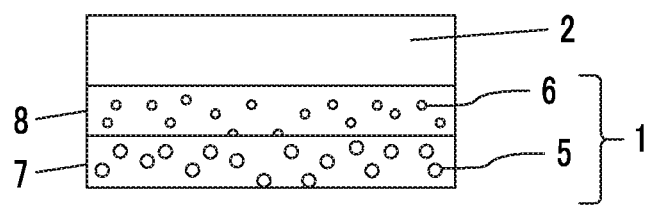
FIG. 12 illustrates an example of the optical conversion member according to one embodiment of the present invention.

In a case where the optical conversion layer is a laminate of two or more layers, as illustrated in FIG. 12, the optical conversion layer is a laminate including at least a layer containing a quantum dot 6 emitting green light, and a layer containing a quantum dot 5 emitting red light, and it is preferable that the optical conversion layer is a laminate in which a layer 7 containing a quantum dot emitting red light, a layer 8 containing a quantum dot emitting green light, and an anisotropic light scattering layer 2 are laminated in this order, from the viewpoint of obtaining an effect of increasing the light emission efficiency by unevenly distributing quantum dots described below in the optical conversion layer.

In a case where the optical conversion layer is a single layer, it is preferable that in the optical conversion member of the first embodiment of the present invention, the optical conversion layer is a layer which contains a quantum dot emitting green light and a quantum dot emitting red light. Even in this case, it is preferable that the respective quantum dots are unevenly distributed in the optical conversion layer as described below, and thus, the effect of increasing the light emission efficiency is obtained.

In the optical conversion member of the first embodiment of the present invention, the following manufacturing method is preferable as a method for manufacturing the anisotropic light scattering layer.

In the optical conversion member of the first embodiment of the present invention, it is preferable that the anisotropic light scattering layer is formed by curing a composition containing a photocurable compound by light irradiation from an azimuth of greater than 0° and less than or equal to 60° from the normal direction of the surface of the anisotropic light scattering layer. The details of such a method for manufacturing the anisotropic light scattering layer are disclosed in a case where a step of forming the anisotropic light scattering layer by photocuring in the method for manufacturing the optical conversion member of the present invention described below is a step (i) of performing light irradiation with respect to a composition containing a photocurable compound from an azimuth of greater than 0° and less than or equal to 600 from the normal direction of the surface of the anisotropic light scattering layer.

In the optical conversion member of the first embodiment of the present invention, it is preferable that the anisotropic light scattering layer is formed by curing a composition containing a polymerizable liquid crystal compound b light irradiation. The details of such a method for manufacturing the anisotropic light scattering layer are disclosed in a case where a step of forming the anisotropic light scattering layer by photocuring in the method for manufacturing the optical conversion member of the present invention described below is a step (ii) of performing light irradiation with respect to a composition containing a polymerizable liquid crystal compound.

(Optical Conversion Member of Second Embodiment)

The optical conversion member of the second embodiment of the present invention includes an anisotropic light scattering layer having I (0°)/I (40°) of greater than or equal to 3, and the anisotropic light scattering layer contains at least one type of quantum dot emitting fluorescent light which is excited by incident excitation light; here, I (0°) indicates a transmission light intensity of the anisotropic light scattering layer at the time of allowing light to be incident on the anisotropic light scattering layer from the normal direction of the surface of the anisotropic light scattering layer, and I (40°) indicates a transmission light intensity of the anisotropic light scattering layer in an azimuth in which a transmission light intensity of the anisotropic light scattering layer at the time of allowing light to be incident on the anisotropic light scattering layer from a direction of a tilt angle of 40° with respect to the normal direction of the surface of the anisotropic light scattering layer becomes a minimum value.

In the optical conversion member of the second embodiment of the present invention, it is preferable that the anisotropic light scattering layer containing the quantum dot contains at least a quantum dot emitting green light and a quantum dot emitting red light as the quantum dot. Even in this case, it is preferable that the respective quantum dots are unevenly distributed in the optical conversion layer as described below, and thus, the effect of increasing the light emission efficiency is obtained.

In the optical conversion member of the second embodiment of the present invention, a method for manufacturing the anisotropic light scattering layer is not particularly limited, and for example, it is preferable that the anisotropic light scattering layer is formed by the following manufacturing method.

In the optical conversion member of the second embodiment of the present invention, it is preferable that the anisotropic light scattering is formed by curing a composition containing a photocurable compound by light irradiation from an azimuth of greater than 0° and less than or equal to 60O from the normal direction of the surface of the anisotropic light scattering layer. The details of such a method for manufacturing the anisotropic light scattering layer are disclosed in a case where a step of forming the anisotropic light scattering layer by photocuring in the method for manufacturing the optical conversion member of the present invention described below is a step (i) of performing light irradiation with respect to a composition containing a photocurable compound from an azimuth of greater than 0° and less than or equal to 60° from the normal direction of the surface of the anisotropic light scattering layer.

<Anisotropic Light Scattering Layer>

The optical conversion member of the present invention includes the anisotropic light scattering layer.

In the optical conversion member of the present invention, I (0°)/I (40°) of the anisotropic light scattering layer is greater than or equal to 3, is preferably greater than or equal to 5 from the viewpoint of a high light extraction efficiency, and is more preferably greater than or equal to 15. Here, I (0°) indicates a transmission light intensity of the anisotropic light scattering layer at the time of allowing light to be incident on the anisotropic light scattering layer from the normal direction of the surface of the anisotropic light scattering layer, and I (40°) indicates a transmission light intensity of the anisotropic light scattering layer in an azimuth in which a transmission light intensity of the anisotropic light scattering layer at the time of allowing light to be incident on the anisotropic light scattering layer from a direction of a tilt angle of 40° with respect to the normal direction of the surface of the anisotropic light scattering layer becomes a minimum value.

In the optical conversion member of the present invention, the half-width of the transmission light intensity profile of the anisotropic light scattering layer is preferably less than or equal to 45° from the viewpoint of a high light extraction efficiency, is more preferably less than or equal to 40°, and is particularly preferably less than or equal to 35°. Here, in the transmission light intensity profile of the anisotropic light scattering layer, the half-width of the transmission light intensity profile of the anisotropic light scattering layer indicates a value obtained by subtracting the minimum value of a tilt angle at which the transmission light intensity becomes 0.5 from the maximum value of the tilt angle at which the transmission light intensity becomes 0.5 when the transmission light intensity of the anisotropic light scattering layer at the time of allowing light to be incident on the anisotropic light scattering layer from the normal direction of the surface of the anisotropic light scattering layer is set to 1.

On the other hand, the lower limit value of the half-width of the transmission light intensity profile is not particularly limited, and for example, is able to be greater than or equal to 5°.

In the present invention, the thickness of the anisotropic optical diffusion layer, the height of a barrier of a dispenser, and a UV irradiation angle or intensity with respect to a photopolymerizable composition are adjusted, and thus, it is possible to set I (0°)/I (40°) to be greater than or equal to 3.

Figure 5:
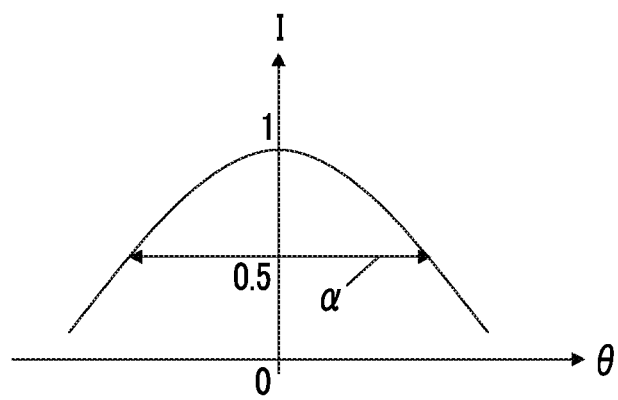
FIG. 5 illustrates an example of a light distribution of transmitted and diffused light of light which is incident on an incidence surface of an isotropic light scattering layer, which is not in the range of the present invention, from a normal direction (a vertical direction).

FIG. 5 illustrates an example of a light distribution of transmitted and diffused light of light which is incident on an incidence surface of an isotropic light scattering layer, which is not in the range of the present invention, from a normal direction (a vertical direction). As illustrated in FIG. 5, the isotropic light scattering layer exhibits a mountain type light distribution in which light intensity monotonously decreases as the tilt angle increases by using a linear transmission direction (angle 0°) as an axis. In the transmission light intensity profile of FIG. 5, a width represented by α is the half-width.

On the other hand, the anisotropic scattering layer has azimuthal angle dependency. Herein, the transmission light intensity profile in a case where a tilt angle θ of the anisotropic light scattering layer is other than 0° is a transmission light intensity profile which is measured in an azimuthal angle at which the transmission light intensity becomes the minimum value after the azimuthal angle is determined by rotating an anisotropic scattering layer sample by each 10° such that the transmission light intensity of the anisotropic scattering layer sample of which θ is set to a value other than 0° (for example, 40°) becomes the minimum value. For example, I (40°) indicates a transmission light intensity of the anisotropic light scattering layer in an azimuth in which a transmission light intensity of the anisotropic light scattering layer at the time of allowing light to be incident on the anisotropic light scattering layer from a direction of a tilt angle of 40° with respect to the normal direction of the surface of the anisotropic light scattering layer becomes a minimum value.

Figure 14A:
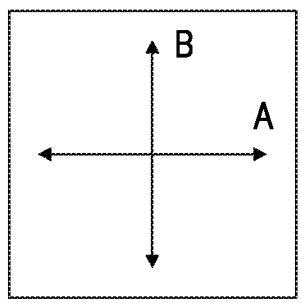
FIG. 14A illustrates an azimuthal angle in light intensity measurement with respect to the anisotropic light scattering layer of the optical conversion member according to one embodiment of the present invention.
Figure 14B:
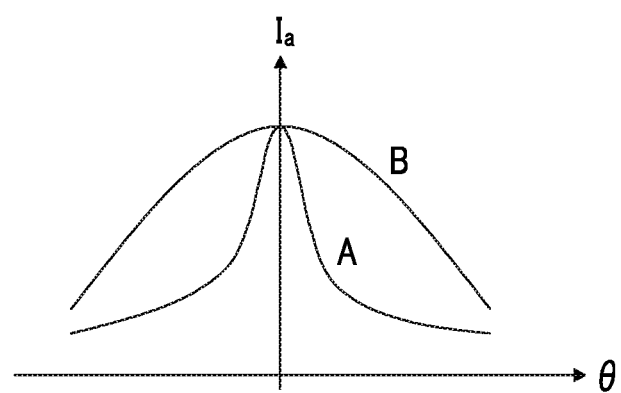
FIG. 14B illustrates an example of a transmission light intensity profile at the azimuthal angle illustrated in FIG. 14A.

In an anisotropic scattering layer sample where an azimuth at which a transmission light intensity becomes the minimum value is set to A, transmission light intensity profiles at an azimuth A at which a light transmission intensity is minimized and an azimuth B at which a light transmission intensity is not minimized are illustrated in FIG. 14A and FIG. 14B. In FIG. 14B, transmission light intensity I is the same absolute value when θ is 0°, and the transmission light intensity becomes the minimum value at the azimuth A when θ is a value other than 0° (for example, 40°). Even though it is not illustrated in FIG. 14A and FIG. 14B, in the anisotropic scattering layer sample illustrated in FIG. 14A and FIG. 14B where the azimuth at which the transmission light intensity becomes the minimum value is the azimuth A, the transmission light intensity becomes the minimum value at the azimuth A in a case where θ is a value other than 0° (for example, 40°), even compared to a transmission light intensity profile at an azimuth other than the azimuth B or the azimuth A.

Furthermore, the transmission light intensity I is the same value regardless of the azimuth of the anisotropic scattering layer when θ is 0°, and thus, in the present invention, an azimuth at the time of measuring I (0°) is temporarily set to the same azimuth as that of I (40°).

Figure 6:
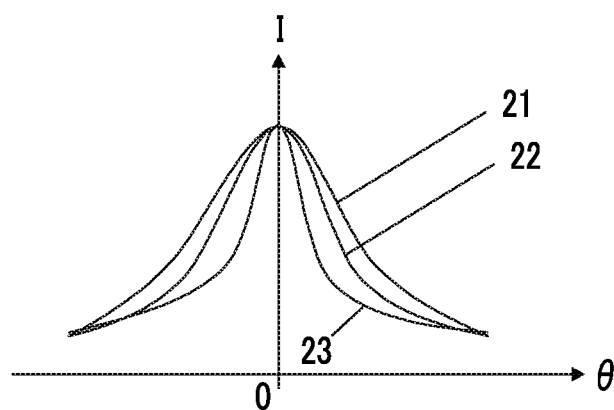
FIG. 6 illustrates an example of a transmission light intensity profile with respect to an anisotropic light scattering layer of the optical conversion member according to one embodiment of the present invention.
Figure 7:
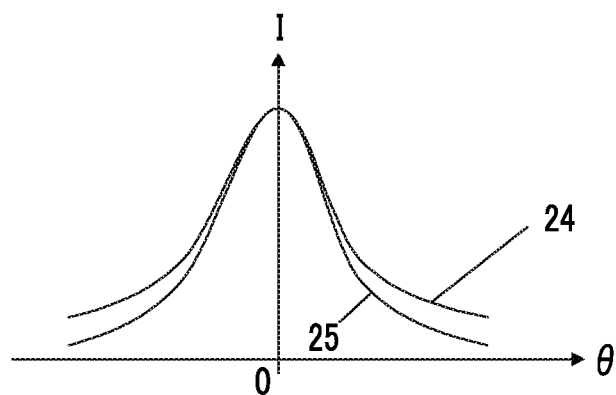
FIG. 7 illustrates another example of the transmission light intensity profile with respect to the anisotropic light scattering layer of the optical conversion member according to one embodiment of the present invention.

In the anisotropic light scattering layer of the optical conversion member of the present invention, examples of a transmission light intensity profile are illustrated in FIG. 6 and FIG. 7.

In FIG. 6, a graph 21 illustrating a relationship between the tilt angle θ and the relative light intensity I of the anisotropic light scattering layer in which I (0°)/I (40°) is 3 and the half-width is 90°, a graph 22 illustrating a relationship between the tilt angle θ and the relative light intensity I of the anisotropic light scattering layer in which I (0°)/I (40°) is 3 and the half-width is 70°, and a graph 23 illustrating a relationship between the tilt angle θ and the relative light intensity I of the anisotropic light scattering layer in which I (0°)/I (40°) is 3 and the half-width is 50° are drawn.

The followings are able to be read from FIG. 6.

A decrease in the half-width corresponds to a fact that a region having high scattering starts from a lower polar angle side.

In FIG. 7, a graph 24 illustrating a relationship between the tilt angle θ and the relative light intensity I of the anisotropic light scattering layer in which I (0°)/I (40°) is 3 and the half-width is 50°, and a graph 25 illustrating a relationship between the tilt angle θ and the relative light intensity I of the anisotropic light scattering layer in which I (0°)/I (40°) is 10 and the half-width is 50° are drawn.

The followings are able to be read from FIG. 7.

An increase in I (0°)/I (40°) corresponds to a fact that scattering in a high polar angle region relatively increases with respect to a front surface.

The anisotropic light scattering layer may have a single layer structure, or may have a laminated structure. A transparent substrate is also able to be laminated on one side (an observation surface side or a rear surface side) or both sides (the observation surface side and the rear surface side) of the anisotropic light scattering layer. In general, the presence of the transparent substrate does not change a light distribution, and thus, a laminate including the transparent substrate on one surface or both surfaces of the anisotropic light scattering layer (hereinafter, also referred to as an anisotropic diffuse sheet) exhibits the same light distribution as that of the anisotropic light scattering layer.

It is preferable that the thickness of the anisotropic light scattering layer (in a case of a laminated structure, the total thickness, but the transparent substrate is excluded) is thin in order to thin the entire member and to allow incidence light to exit with high transmittance. From this viewpoint, the thickness of the optical diffusion layer is preferably less than or equal to 500 µm, and is more preferably less than or equal to 200 µm. On the other hand, the thickness of the anisotropic light scattering layer is preferably greater than or equal to 20 µm, and is more preferably greater than or equal to 40 µm, from the viewpoint of more effectively controlling a light distribution of light having each color by disposing the anisotropic light scattering layer.

A transparent substrate having high transparency is preferable as the transparent substrate described above. Specifically, the total light ray transmittance (JIS K7361-1) of the transparent substrate described above is preferably greater than or equal to 80%, is more preferably greater than or equal to 85%, and is even more preferably greater than or equal to 90%. Examples of the transparent substrate described above include a transparent plastic film, a glass plate, and the like, and the plastic film is preferable from the viewpoint of excellent thinness, excellent light weight properties, excellent impact resistance, and excellent productivity. Examples of the material of the plastic film described above include polyethylene terephthalate (PET), polyethylene naphthalate (PEN), triacetyl cellulose (TAC), polycarbonate (PC), polyarylate, polyimide (PI), aromatic polyamide, polysulfone (PS), polyether sulfone (PES), cellophane, polyethylene (PE), polypropylene (PP), polyvinyl alcohol (PVA), a cycloolefin resin, and the like. Among the plastic films, PET, PEN, or the cycloolefin resin is particularly preferable from the viewpoint of transparency, film intensity, and productivity. Examples of an embodiment of the plastic film described above include an embodiment in which a film is formed by independently using the materials described above or by mixing the materials, an embodiment in which the films described above are laminated, and the like. In consideration of application or productivity, the thickness of the transparent substrate described above is preferably 1 µm to 5 mm, is more preferably 10 to 500 µm, and is even more preferably 50 to 150 µm. In addition, in an application where a member including a middle-sized or small-sized panel such as a tablet or a smart phone is strongly required to be thinned, it is preferable that the thickness of the transparent substrate is 15 µm to 50 µm.

Diffusion properties of the anisotropic light scattering layer are not able to be uniquely indicated, and for example, the amount of linearly transmission light is able to be used as an index of the diffusion properties. Furthermore, the amount of linearly transmission light is the amount of parallel light ray exiting in a direction identical to an incidence direction when a predetermined amount of parallel light ray is incident thereon. Examples of a measurement method of the amount of linearly transmission light described above include a method in which a light receiving section (for example, a goniophotometer) is fixed to a position receiving rectilinearly propagating light from a light source, a test piece is arranged between the light source and the light receiving section, and the test piece is rotated around a certain rotation axis, and thus, an incidence angle is changed at an azimuth (a measurement azimuth) vertical to an in-plane rotation axis of an exit side surface, and the amount of linearly transmission light is able to be measured. The measurement azimuth described above is able to be suitably changed by changing a rotation axis direction. Therefore, according to this method, it is possible to measure the amount of linearly transmission light in various directions.

<Optical Conversion Layer or Anisotropic Light Scattering Layer Containing Quantum Dot (Existence Embodiment of Quantum Dot)>

In a case where a plurality of quantum dots having different light emission properties are simultaneously used, for example, a plurality of quantum dots may be evenly mixed in the same layer, or may be separately mixed in a separate layer and may form an independent layer. The thickness of one layer of the optical conversion layer or the anisotropic light scattering layer containing the quantum dot is preferably less than or equal to 300 µm from the viewpoint of obtaining sufficient excitation light transmission, and is preferably greater than or equal to 1 µm from the viewpoint of obtaining sufficient fluorescent light. The thickness of one layer of the optical conversion layer or the anisotropic light scattering layer containing the quantum dot is more preferably in a range of 10 to 250 μm.

In a case where the optical conversion layer is a quantum dot sheet, such a quantum dot sheet is not particularly limited, and a known quantum dot sheet is able to be used. Such a quantum dot sheet, for example, is disclosed in JP2012-169271A, SID'12 DIGEST p. 895, JP2010-532005A, and the like, and the contents of the literatures are incorporated in the present invention. In addition, a commercially available quantum dot sheet, for example, a quantum dot enhancement film (QDEF, manufactured by Nano-Sys Co., Ltd.) is able to be used as such a quantum dot sheet.

In a case where the optical conversion layer is a thermoplastic film which is formed by being stretched after dispersing a quantum dot material, such a thermoplastic film is not particularly limited, and a known thermoplastic film is able to be used. Such a thermoplastic film, for example, is disclosed in JP2001-174636A, JP2001-174809A, and the like, and the contents of the literatures are incorporated in the present invention.

In a case where the optical conversion layer is an adhesive layer in which a quantum dot material is dispersed, such an adhesive layer is not particularly limited, and an adhesive layer in which the quantum dot materials or the like disclosed in JP2012-169271A, SID'12 DIGEST p. 895, JP2001-174636A, JP2001-174809A, JP2010-532005A, and the like are dispersed in a known adhesive layer is able to be used.

It is preferable that the optical conversion layer or the anisotropic light scattering layer containing the quantum dot described above contains a quantum dot (A) having a light emission center wavelength in a wavelength range of 600 nm to 680 nm, and one type of more quantum dots (Z) having a light emission center wavelength in a wavelength range shorter than that of the quantum dot (A). Then, in the optical conversion layer described above, it is preferable that the quantum dots (A) are relatively unevenly distributed with respect to the quantum dots (Z) on an excitation light incidence side. Here, in the optical conversion layer or the anisotropic light scattering layer containing the quantum dot, the quantum dots (A) being relatively unevenly distributed with respect to the quantum dots (Z) on the excitation light incidence side indicates that an existence ratio of the quantum dot (A) in the incidence side region is greater than an existence ratio of the quantum dot (Z) (only one type of quantum dot, or two or more types of quantum dots) in the incidence side region when the optical conversion layer or the anisotropic light scattering layer containing the quantum dot is divided into two regions of an incidence side region and an exit side region in an arbitrary surface vertical to incidence light. More specifically, in a case where the number of quantum dots (A) in the incidence side region is A1, the number of quantum dots (A) in the exit side region is A2, the number of quantum dots (Z) in the incidence side region is Z1, and the number of quantum dots (Z) in the exit side region is Z2, it is indicated that an existence ratio $[A1/(A1+A2)]$ of the quantum dot (A) in the incidence side region to the total quantum dot (A) $(A1+A2)$ in the optical conversion layer is greater than an existence ratio $[Z1/(Z1+Z2)]$ of the quantum dot (Z) in the incidence side region to the total quantum dot (Z1+Z2) in the optical conversion layer, that is, Expression (1) described below is satisfied.

$$A1/(A1+A2) > Z1/(Z1+Z2) \quad (1)$$

The uneven distribution of the quantum dot in the optical conversion layer or the anisotropic light scattering layer containing the quantum dot is able to be measured by cutting the optical conversion layer or the anisotropic light scattering layer containing a quantum dot at an arbitrary portion, by observing the sectional surface thereof by using a polarizing microscope, by measuring the number of quantum dots, and by calculating the following equation.

A direction vertical to the excitation light incidence side surface and the exit side surface of the optical conversion layer or the anisotropic light scattering layer containing the quantum dot is an x axis. The thickness of the optical conversion layer or the anisotropic light scattering layer containing the quantum dot along the x axis is L, x=0 is defined as the excitation light incidence side surface, and x=L is defined as the exit side. A standardized numerical density distribution of the quantum dot (A) is ΦA (x), and a standardized numerical density distribution of the quantum dot (Z) is ΦZ(x).

That is, $$\int(0 \to L)\phi A(x)dx = 1$$

$$\int(0 \to L)\phi Z(x)dx = 1$$

is established.

Φ denoted by the following equation is defined as an index indicating the uneven distribution of the quantum dots (A) and (Z).

$$\Phi = \int(0 \to L)\phi A(x) \times \{\int(x \to L)\phi Z(x)dx\}dx$$

A case of Φ=1 indicates that the quantum dots (A) are unevenly distributed onto the incidence side without including a region mixed with the quantum dot (Z), and a case of Φ=0 indicates that the quantum dots (A) are unevenly distributed onto the exit side without including a region mixed with the quantum dot (Z).

In addition, in a case where the quantum dot (A) and the quantum dot (Z) are mixed and evenly dispersed, Φ=0.5 is obtained.

Φ is preferably greater than 0.5, Φ is more preferably greater than 0.7, Φ is even more preferably greater than 0.8, and Φ is still more preferably greater than 0.95, from the viewpoint of a light emission efficiency of the quantum dot.

As described above, the quantum dots (A) in the optical conversion layer or the anisotropic light scattering layer containing the quantum dot are relatively unevenly distributed with respect to the quantum dots (Z) on the excitation light incidence side, and thus, it is possible to prevent the quantum dot (A), which is a quantum dot emitting red light, from absorbing fluorescent light emitted from the quantum dot (Z) which is excited. Accordingly, it is possible to increase a light emission efficiency of the optical conversion member containing the quantum dot.

Hereinafter, the optical conversion member described above will be described in more detail.

It is preferable that the optical conversion member described above is included as a configuration member of a backlight unit of a liquid crystal display device.

Figure 13:
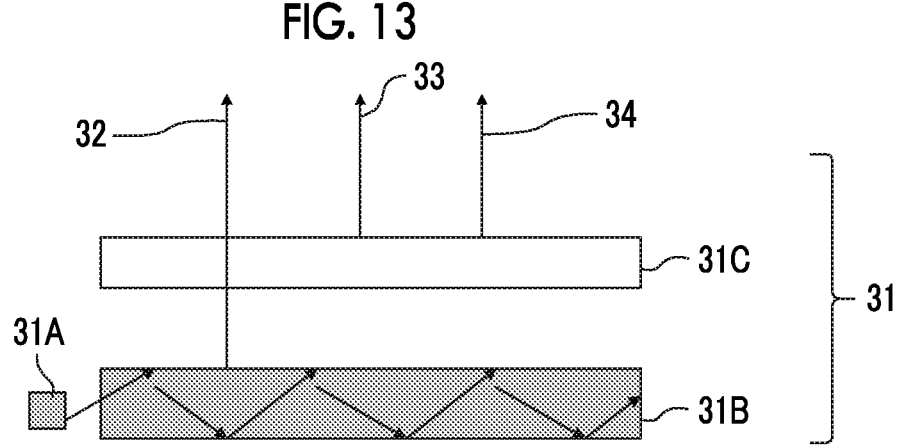
FIG. 13 illustrates an example of a backlight unit according to one embodiment of the present invention.

FIG. 13 is an explanatory diagram of an example of a backlight unit 31 including a sheet-like optical conversion member according to one embodiment of the present invention. In FIG. 13, the backlight unit 31 includes a light source 31A, and a light guide plate 31B for being used as a plane light source. In the example illustrated in FIG. 13, the optical conversion member is arranged on a path of light exiting from the light guide plate.

Then, in the example illustrated in FIG. 13, light exiting from the light guide plate 31B is incident on an optical conversion member 31C. In the example illustrated in FIG. 13, light 32 which exits from the light source 31A arranged on an edge portion of the light guide plate 31B is blue light, and exits towards a liquid crystal cell from the surface of the light guide plate 31B on the liquid crystal cell (not illustrated) side. It is preferable that the optical conversion member 31C arranged on the path of the light (the blue light 32) exiting from the light guide plate 31B contains at least the quantum dot (A) emitting red light 34 which is excited by the blue light 32 and a quantum dot (B) emitting green light 33 which is excited by the blue light 32. Thus, the excited green light 33 and the excited red light 34, and the blue light 32 transmitted through the optical conversion member 31C exit from the backlight unit 31. Thus, bright line light of RGB is emitted, and thus, it is possible to embody white light.

The optical conversion member includes the optical conversion layer containing the quantum dot which is excited by incident excitation light and emits fluorescent light or the anisotropic light scattering layer containing the quantum dot. A barrier film (also referred to as a barrier layer) and the like are able to be included as other arbitrary configuration members. The details thereof will be described below.

It is preferable that the optical conversion layer or the anisotropic light scattering layer containing the quantum dot contains the quantum dot (A) having a light emission center wavelength in a wavelength range of 600 nm to 680 nm, and one or more types of quantum dots (Z) having a light emission center wavelength in a wavelength range shorter than that of the quantum dot (A). The quantum dot (A) is able to emit red light by receiving excitation light. On the other hand, it is preferable that the quantum dot (Z) contains the quantum dot (B) having a light emission center wavelength in a wavelength range of 500 nm to 600 nm. The quantum dot (B) is able to emit green light by receiving excitation light. Thus, for example, blue light is incident on the optical conversion member including the optical conversion layer containing the quantum dot emitting the red light and the quantum dot emitting the green light, and as described above, it is possible to obtain an optical conversion member which is able to emit bright line light of RGB. However, as described above, in such an optical conversion member, the quantum dot (A) absorbs light emitted from the quantum dot (Z), and thus, it is difficult to realize a high light emission efficiency. In contrast, in the optical conversion member according to one embodiment of the present invention, in the optical conversion layer or the anisotropic light scattering layer containing the quantum dot, it is preferable that the quantum dots (A) are relatively unevenly distributed with respect to the quantum dots (Z) on the excitation light incidence side. On the contrary, in the optical conversion layer or the anisotropic light scattering layer containing the quantum dot where the quantum dots (Z) are more relatively unevenly distributed onto the excitation light incidence side than the quantum dot (A), incidence light is preferentially absorbed in the quantum dot (Z), and the quantum dot (Z) emits fluorescent light. A light absorption spectrum of the quantum dot (A) emitting the red light widens to a wavelength side shorter than that of the red light, and thus, the fluorescent light emitted from the quantum dot (Z) is absorbed by the quantum dot (A). In contrast, in the optical conversion member according to one embodiment of the present invention described above, light which is incident on the optical conversion layer or the anisotropic light scattering layer containing the quantum dot is preferentially absorbed in the quantum dot (A), and thus, first, the quantum dot (A) emits light. The red light emitted from the quantum dot (A) is not absorbed in the quantum dot (B) having a light emission center wavelength in a wavelength range shorter than that of the quantum dot (Z), or the absorption amount thereof decreases, and thus, light emitted from the quantum dot (A) is able to be used with a high efficiency.

Furthermore, the quantum dot (Z) may be only one type of quantum dot, or may be two or more types of quantum dots. For example, a quantum dot having a light emission center wavelength in a wavelength range shorter than that of the quantum dot (B), preferably, a quantum dot (C) having a light emission center wavelength in a wavelength range of 400 nm to 500 nm is able to be contained as the quantum dot (Z).

The quantum dot (C) is a quantum dot which is excited and emits blue light. For example, in a case where a light source emitting ultraviolet light of 300 to 430 nm is used as a light source, the quantum dot (C) is contained in the optical conversion layer or the anisotropic light scattering layer containing the quantum dot along with the quantum dots (A) and (B), and thus, it is possible to emit bright line light of RGB by the red light emitted from the quantum dot (A), the green light emitted from the quantum dot (B), and the blue light from the quantum dot (C), and therefore, it is possible to embody white light. In this case, from the reason described above, it is preferable that the quantum dots (B) in the optical conversion layer or the anisotropic light scattering layer containing the quantum dot are relatively unevenly distributed with respect to the quantum dots (C) on the excitation light incidence side.

In the quantum dot (A) having a light emission center wavelength in a wavelength range of 600 to 680 nm, it is preferable that light absorbance in a light emission wavelength of one type or more quantum dots (Z) having a light emission center wavelength in a wavelength range shorter than that of the quantum dot (A) is less than light absorbance in an excitation light wavelength.

In a case where a red quantum dot having a light emission center wavelength in a wavelength range of 600 to 680 nm and a green quantum dot having a light emission center wavelength in a wavelength range of 520 to 550 nm are excited by light from a blue light source having a light emission center wavelength in a wavelength range of 440 to 470 nm, a ratio A (450)/A (530) of light absorbance A (530) of the red quantum dot at 530 nm to light absorbance A (450) at 450 nm is preferably greater than or equal to 3, is more preferably greater than or equal to 5, and is even more preferably greater than or equal to 10. The absorption of green light emission due to the red quantum dot is suppressed as the value of A (450)/A (530) increases, and thus, an increase in the value of A (450)/A (530) contributes to improvement in a light utilization efficiency of a film.

Hereinafter, a specific embodiment of the uneven distribution of the quantum dot (A) in the optical conversion layer or the anisotropic light scattering layer containing the quantum dot will be described. In the drawings described herein, a lower portion in the drawing is the incidence side, and an upper portion is the exit side.

FIG. 12 is an explanatory diagram of the optical conversion member according to one embodiment of the present invention. The quantum dots (A) in the optical conversion layer are relatively unevenly distributed with respect to quantum dots having a light emission center wavelength in a wavelength range shorter than that of the quantum dot (A) on the excitation light incidence side.

In one embodiment of the optical conversion member, in the optical conversion layer, it is preferable that a first quantum dot layer containing only the quantum dot (A) as the quantum dot and a second quantum dot layer containing only the quantum dot (B) as the quantum dot are laminated to be directly adjacent to each other. Such a quantum dot layer is able to be prepared by dispersing quantum dots in a resin material. Thus, it is possible to obtain a quantum dot layer in which a quantum dot is contained in a matrix material containing at least a binder resin. The shape of the quantum dot layer is not particularly limited, and the quantum dot layer is able to have an arbitrary shape such as a sheet-like shape and a bar-like shape, and the sheet-like shape is preferably since the effect of the present invention is easily obtained.

Core-shell type semiconductor nanoparticles are preferable as the quantum dot from the viewpoint of improving durability. II-VI semiconductor nanoparticles, III-V semiconductor nanoparticles, multicomponent semiconductor nanoparticles, and the like are able to be used as a core. Specifically, examples of the core include CdSe, CdTe, CdS, ZnS, ZnSe, ZnTe, InP, InAs, InGaP, CuInS$_2$, and the like, but are not limited thereto. Among them, CdSe, CdTe, InP, InGaP, and CuInS$_2$ are preferable from the viewpoint of emitting visible light with a high efficiency. CdS, ZnS, ZnO, GaAs, and a composite thereof are able to be used as a shell, but examples of the shell are not limited thereto.

The quantum dot, for example, can be referred to paragraphs 0060 to 0066 of JP2012-169271A, but is not limited thereto. A commercially available product is able to be used as the quantum dot without any limitation. In general, a light emission wavelength of the quantum dot is able to be adjusted according to the composition and the size of the particles.

A sheet-like quantum dot layer is preferably prepared by a coating method. Specifically, a polymerizable composition (a curable composition) containing a quantum dot is applied onto a substrate or the like, and then, a curing treatment is performed by light irradiation or the like, and thus, a sheet-like quantum dot layer is able to be obtained. In addition, polymerizable compositions having different compositions, different quantum dot concentrations, or different compositions and quantum dot concentrations are sequentially applied and cured, and thus, two or more quantum dot layers are able to be laminated. Alternatively, two or more types of polymerizable compositions containing the same type of quantum dot in different concentrations are applied in the order from a high concentration to a low concentration or in the opposite order, and thus, a quantum dot layer is able to be prepared in which the concentration of the quantum dot is continuously or gradually changed. The coating may be performed by simultaneous multilayer coating (an upper layer is applied while an underlayer is not dried yet) and sequential multilayer coating (the upper layer is applied after the underlayer is dried, preferably after the underlayer is cured). According to the sequential multilayer coating, mixing between layers rarely occurs, and thus, it is preferable that the sequential multilayer coating is performed in order to obtain a quantum dot layer containing only one type of quantum dot. On the other hand, when two or more types of polymerizable compositions containing the same type of quantum dot in different concentrations are laminated, and thus, a quantum dot layer is obtained in which the concentration of the quantum dot is continuously changed, both of the simultaneous multilayer coating and the sequential multilayer coating are preferable.

A polymerizable compound which is used for preparing the polymerizable composition is not particularly limited. However, in a case of forming an anisotropic scattering layer containing a quantum dot, it is preferable that the anisotropic scattering layer containing the quantum dot is manufactured by the manufacturing method of the anisotropic light scattering layer containing the quantum dot described above.

A (meth)acrylate compound such as a monofunctional or polyfunctional (meth)acrylate monomer, a polymer or a prepolymer thereof, and the like are preferable from the viewpoint of transparency, adhesiveness, and the like of a cured film after being cured. Furthermore, in the present invention and herein, "(meth)acrylate" is used as the concept including at least one of acrylate or methacrylate. The same applies to "(meth)acryloyl" or the like.

Examples of the monofunctional (meth)acrylate monomer are able to include an acrylic acid and a methacrylic acid, and a derivative thereof, and more specifically, a monomer having one polymerizable unsaturated bond of a (meth)acrylic acid (one (meth)acryloyl group) in the molecules. Specific examples thereof can be referred to the description disclosed in paragraph [0022] of WO2012/077807A1.

A polyfunctional (meth)acrylate monomer having two or more (meth)acryloyl groups in the molecules is able to be used along with a monomer having one polymerizable unsaturated bond of the (meth)acrylic acid (one (meth)acryloyl group) in one molecule. The details thereof can be referred to the description disclosed in paragraph [0024] of WO2012/077807A1. In addition, a polyfunctional (meth)acrylate compound disclosed in paragraphs [0023] to [0036] of JP2013-043382A is able to be used as the polyfunctional (meth)acrylate compound. Further, an alkyl chain-containing (meth)acrylate monomer denoted by General Formulas (4) to (6) disclosed in paragraphs [0014] to [0017] of the specification of JP5129458B is also able to be used.

The use amount of the polyfunctional (meth)acrylate monomer is preferably greater than or equal to 5 parts by mass, from the viewpoint of strength of a coating film, and is preferably less than or equal to 95 parts by mass from the viewpoint of suppressing gelation of the composition, with respect to 100 parts by mass of the total amount of the polymerizable compound contained in the polymerizable composition.

The polymerizable composition described above is able to contain a known radical initiator as a polymerization initiator. The polymerization initiator, for example, can be referred to paragraph 0037 of JP2013-043382A. The polymerization initiator is preferably greater than or equal to 0.1 mol %, and is more preferably 0.5 to 2 mol %, with respect to the total amount of the polymerizable compound contained in the polymerizable composition.

The quantum dot may be added in a state of the particles of the polymerizable composition, or may be added in a state of a dispersion liquid in which the quantum dots are dispersed in a solvent. Adding the quantum dot in a state of the dispersion liquid is preferable from the viewpoint of suppressing aggregation of the particles of the quantum dot. Here, a solvent to be used is not particularly limited. The added amount of the quantum dot, for example, is able to be approximately 0.1 to 10 parts by mass, with respect to 100 parts by mass of the total amount of the composition.

The polymerizable composition containing the quantum dot described above is applied onto a suitable support (preferably a transparent support, examples of the transparent support include the transparent substrate described above, and the support may be included in the optical conversion member of the present invention, or may be removed therefrom), and is dried, and a solvent is removed, and then, the polymerizable composition is polymerized and cured by light irradiation or the like, and thus, the quantum dot layer is able to be obtained. Examples of a coating method include a known coating method such as a curtain coating method, a dip coating method, a spin coating method, a printing coating method, a spray coating method, a slot coating method, a roll coating method, a slide coating method, a blade coating method, a gravure coating method, and a wire bar method. In addition, curing conditions are able to be suitably set according to the type of polymerizable compound to be used or the composition of the polymerizable composition.

The total thickness of the optical conversion layer is preferably less than or equal to 500 μm from the viewpoint of obtaining sufficient excitation light transmittance, and is preferably greater than or equal to 1 μm from the viewpoint of obtaining sufficient fluorescent light. The total thickness of the optical conversion layer is more preferably in a range of 10 to 100 μm. In addition, in a case where the optical conversion layer includes a plurality of quantum dot layers or quantum dot mixed layers, the film thickness of one layer is preferably in a range of 1 to 300 μm, and is more preferably in a range of 3 to 50 μm.

In another embodiment of the optical conversion member, in the optical conversion layer, it is preferable that the first quantum dot layer containing only the quantum dot (A) as the quantum dot and the second quantum dot layer containing only the quantum dot (B) as the quantum dot are laminated through a quantum dot mixed layer containing the quantum dot (A) and the quantum dot (B). In the quantum dot mixed layer, the quantum dots (A) and the quantum dots (B) may be evenly dispersed, or the quantum dots (A) may be unevenly distributed with respect to the quantum dots (B) on the incidence side. It is preferable that the latter embodiment is preferable from the viewpoint of further improving a light emission efficiency.

In another embodiment of the optical conversion member, it is preferable that the optical conversion layer is the quantum dot mixed layer of the quantum dot (A) and the quantum dot (B), and the quantum dots (A) are unevenly distributed with respect to the quantum dots (B) on the incidence side. Such a quantum dot mixed layer, for example, is able to be obtained as described above.

In another embodiment of the optical conversion member, in the optical conversion layer, it is preferable that the first quantum dot layer containing only the quantum dot (A) as the quantum dot and the second quantum dot layer containing only the quantum dot (B) as the quantum dot are laminated to be directly adjacent to each other, and a third quantum dot layer containing only the quantum dot (C) as a quantum dot, which has a light emission center wavelength in a wavelength range shorter than that of the quantum dot (B), that is, in a wavelength range of 400 nm to 500 nm, is included as a layer which is directly adjacent to the second quantum dot layer. In the optical conversion member of this embodiment, for example, a light source (a UV light source) having a light emission center wavelength in a wavelength range of 300 nm to 430 nm is used as a light source, and thus, red light is emitted from the first quantum dot layer, green light is emitted from the second quantum dot layer, and blue light is emitted from the third quantum dot layer, and therefore, it is possible to embody white light.

Figure 9:
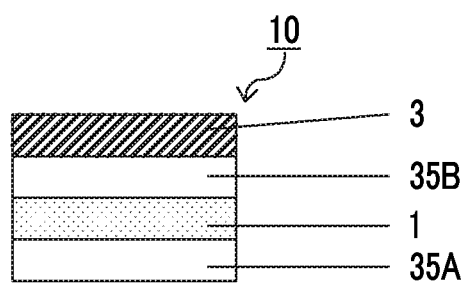
FIG. 9 illustrates an example of the optical conversion member according to one embodiment of the present invention.

In the optical conversion member illustrated in FIG. 9, barrier films 35A and 35B are disposed on both surfaces of the optical conversion layer 1. Further, in the optical conversion member illustrated in FIG. 9, the anisotropic light scattering layer 3 is disposed as a layer which is directly adjacent to the exit side barrier film 35B.

Figure 10:
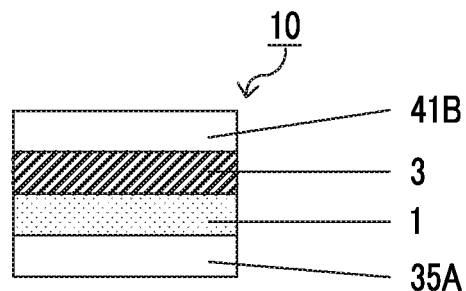
FIG. 10 illustrates an example of the optical conversion member according to one embodiment of the present invention.

In the optical conversion member illustrated in FIG. 10, the incidence side barrier film 35A is disposed on the optical conversion layer 1 on the incidence side, and the exit side barrier film 35B is disposed on the anisotropic light scattering layer 3 on the exit side, respectively, with respect to a laminate of the optical conversion layer 1 and the anisotropic light scattering layer 3.

Figure 11:
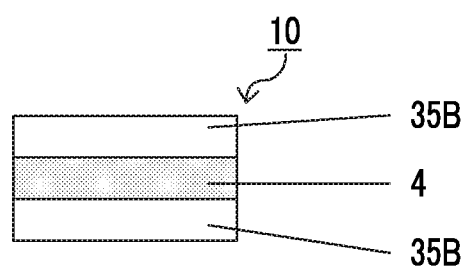
FIG. 11 illustrates an example of the optical conversion member according to one embodiment of the present invention.

In the optical conversion member illustrated in FIG. 11, the barrier film 35A and 35B are disposed on both surfaces of the anisotropic light scattering layer 4 containing the quantum dot.

The barrier film is preferably a film having oxygen barrier properties, and is able to have a function of preventing a quantum efficiency (a light emission efficiency) from decreasing by aging deterioration of the quantum dot due to oxygen. More specifically, a photooxidation reaction of the quantum dot due to excitation light is able to be suppressed. It is preferable that a film having oxygen permeability of less than 1.0 $cm^3/(m^2 \cdot day)$ is used as the barrier film from the viewpoint of obtaining a high quantum efficiency over a long period of time. Such a barrier film is able to be an organic layer, an inorganic layer, or a laminated film of two or more layers of the organic layer and the inorganic layer. The details will be described below. Furthermore, in FIG. 9, FIG. 10, and FIG. 11, a configuration is illustrated in which the barrier film is arranged on the optical conversion layer on the incidence side and the exit side, respectively, but the barrier film may be arranged only on the incidence side, or may be arranged only on the exit side. It is preferable that the barrier film is arranged on the optical conversion layer on both of the incidence side and the exit side, from the viewpoint of maintaining an excellent quantum efficiency for a long period of time.

Thus, it is possible to maintain a higher light emission efficiency for a long period of time by combining the light scattering layer and the barrier film.

In another embodiment of the optical conversion member, it is preferable the barrier film is disposed on both surfaces of the optical conversion layer, and the anisotropic light scattering layer is disposed on the exit side barrier film on the exit side. In addition, it is preferable that a light reflecting layer is disposed on the incidence side barrier film on the incidence surface side or between the exit side barrier film and the anisotropic light scattering layer, respectively. Disposing the light reflecting layer on the optical conversion member is effective from the viewpoint of increasing a light utilization efficiency. The light reflecting layer is preferably a cholesteric layer, and the details thereof will be described below.

As described above, the specific embodiment of the optical conversion member according to one embodiment of the present invention has been described on the basis of the drawings, but the present invention is not limited to the specific embodiment, and various modifications also included in the present invention. In addition, in the above description, an arbitrary layer such as an adhesive layer is also able to be arranged between layers which are described as the layers directly adjacent to each other.

<Barrier Film>

Next, the barrier film described above will be described.

As described above, the oxygen permeability of the barrier film is preferably less than or equal to 1.0 $cm^3/(m^2 \cdot day)$, is more preferably less than or equal to 0.5 $cm^3/(m^2 \cdot day)$, is even more preferably less than or equal to 0.1 $cm^3/(m^2 \cdot day)$, is still more preferably less than or equal to 0.05 $cm^3/(m^2 \cdot day)$, and is still even more preferably less than or equal to 0.001 $cm^3/(m^2 \cdot day)$.

On the other hand, water vapor permeability of the barrier film is less than or equal to 0.5 $g/(m^2 \cdot day)$, and in particular, is preferably less than or equal to 0.1 $g/(m^2 \cdot day)$, and is particularly preferably less than or equal to 0.05 g/(m²·day). By using the barrier film having low oxygen permeability, it is possible to suppress the deterioration of the quantum dot due to oxygen, and it is possible to maintain a light emission efficiency for a long period of time.

Here, the oxygen permeability described above is a value measured by using an oxygen gas permeability measurement device (OX-TRAN 2/20: Product Name, manufactured by MOCON Inc.) under conditions of a measurement temperature of 23° C. and relative humidity of 90%, and the water vapor permeability described above is a value measured by using an water vapor permeability measurement device (PERMATRAN-W 3/31: Product Name, manufactured by MOCON Inc.) under conditions of a measurement temperature of 37.8° C. and relative humidity of 100%.

The barrier film may be a single layer of an organic layer or an inorganic layer, or may be a laminated structure of two or more layers. For example, the barrier film is able to be obtained by forming two or more organic layers or inorganic layers on a substrate. Examples of a layer configuration of the barrier film are able to include a configuration in which the substrate/the inorganic layer/the organic layer are laminated in this order from the optical conversion layer side towards the outside, a configuration in which the substrate/the inorganic layer/the organic layer/the inorganic layer are laminated in this order from the optical conversion layer side towards the outside, and the like, but a lamination order is not particularly limited.

A transparent substrate which is transparent with respect to visible light is preferable as the substrate, and the transparent substrate described above is more preferable. Here, being transparent with respect to the visible light indicates that light ray transmittance in a visible light region is greater than or equal to 80%, and is preferably greater than or equal to 85%. The light ray transmittance which is used as the scale of transparency is able to be calculated by measuring the total light ray transmittance and the amount of scattering light using a method disclosed in JIS-K7105, that is, an integrating sphere type light ray transmittance measurement device, and by subtracting diffusion transmittance from the total light ray transmittance. The substrate can be referred to paragraphs 0046 to 0052 of JP2007-290369A and paragraphs 0040 to 0055 of JP2005-096108A. The thickness of the substrate is preferably in a range of 10 μm to 500 μm, is more preferably in a range of 10 to 200 μm, and is particularly preferably in a range of 20 to 100 μm, from the viewpoint impact resistance, handling in the manufacturing of the barrier film, and the like.

The inorganic layer can be referred to paragraphs 0043 to 0045 of JP2007-290369 and paragraphs 0064 to 0068 of JP2005-096108. The film thickness of the inorganic layer is in a range of 10 nm to 500 nm, and in particular, is preferably in a range of 10 nm to 300 nm, and is particularly preferably in a range of 10 nm to 150 nm. By setting the film thickness of the inorganic layer to be in the range described above, it is possible to suppress reflection on the barrier film while realizing excellent gas barrier properties, and it is possible to suppress the total light ray transmittance from decreasing. In particular, it is preferable that the inorganic layer is a silicon oxide film, or a silicon oxynitride film. This is because the films are able to realize more excellent gas barrier properties since adhesiveness with respect to the organic film is excellent.

The organic layer can be referred to paragraphs 0020 to 0042 of JP2007-290369A and paragraphs 0074 to 0105 of JP2005-096108A. Furthermore, it is preferable that the organic layer contains a CARDO polymer. Accordingly, adhesiveness with respect to a layer adjacent to the organic layer or the substrate, and in particular, adhesiveness with respect to the inorganic layer becomes excellent, and more excellent gas barrier properties are able to be realized. The details of the CARDO polymer can be referred to paragraphs 0085 to 0095 of JP2005-096108A described above. The film thickness of the organic layer is preferably in a range of 0.05 μm to 10 μm, and in particular, is preferably in a range of 0.5 to 10 μm. In a case where the organic layer is formed by a wet coating method, the film thickness of the organic layer is in a range of 0.5 to 10 μm, and in particular, is preferably in a range of 1 μm to 5 μm. In addition, in a case where the organic layer is formed by a dry coating method, the film thickness of the organic layer is in a range of 0.05 μm to 5 μm, and in particular, is preferably in a range of 0.05 μm to 1 μm. By setting the film thickness of the organic layer which is formed by the wet coating method or the dry coating method to be in the range described above, it is possible to make the adhesiveness with respect to the inorganic layer more excellent.

The other details of the barrier film can be referred to JP2007-290369A and JP2005-096108A described above, and the description in US2012/0113672A1.

In one embodiment, an optical thin film of a single layer (formed of one layer) is able to be laminated on the air interface on the barrier film. A layer of low refractive index, in which a refractive index n (535) of the optical thin film a wavelength of 535 nm is lower than a refractive index nu (535) of a layer directly adjacent to the optical thin film in the barrier film, is preferable as such an optical thin film. By arranging such an optical thin film to be adjacent to the barrier film, it is possible to attain further improvement in brightness and color reproducibility. The refractive index n (535) of the optical thin film at a wavelength of 535 nm is preferably 1.20 to 1.51, is more preferably 1.30 to 1.46, and is even more preferably 1.40 to 1.46.

Furthermore, a thickness d of the optical thin film is preferably 0.5 to 2 μm, and is more preferably 0.7 to 1.5 μm. A known constituent is able to be used as a constituent of the optical thin film. For example, a constituent or the like suitable as a material which is able to configure the organic layer of the barrier film is able to be used.

The barrier film, in which the optical thin film described above is laminated, may be laminated with the optical conversion layer such that the surface of the optical thin film is arranged on the air interface side, or the opposite configuration may be used.

(Light Reflecting Layer)

The light reflecting layer is preferably a cholesteric layer as described above. A manufacturing method of a light reflecting layer formed by immobilizing a cholesteric liquid crystalline phase, which is used in an embodiment of the light reflecting layer, is not particularly limited. For example, methods disclosed in JP1989-133003A (JP-H01-133003A), JP3416302B, JP3363565B, and JP1996-271731A (JP-H08-271731A) are able to be used, and the contents of the publications are incorporation in the present invention.

When the cholesteric liquid crystal layer described above is superposed, it is desirable to use a combination of reflecting clockwise circular polarization and counterclockwise circular polarization. Specifically, the combination is obtained by laminating a right-twisted cholesteric liquid crystal and a left-twisted cholesteric liquid crystal. Accordingly, it is possible to reflect all of polarized light rays, and thus, it is possible to increase a reflection efficiency.

A suitable cholesteric liquid crystal may be used as the cholesteric liquid crystal, and is not particularly limited. It is advantageous to use a liquid crystal polymer from the viewpoint of a superposition efficiency, thinning, or the like of liquid crystal layer. In addition, cholesteric liquid crystal molecules having large birefringence are preferable since a selective reflection wavelength range widens.

For example, a suitable liquid crystal polymer such as a main chain type liquid crystal polymer such as polyester, a side chain type liquid crystal polymer formed of an acrylic main chain or a methacrylic main chain, and a siloxane main chain, a nematic liquid crystal polymer containing a low molecular chiral agent contain, a liquid crystal polymer into which a chiral component is introduced, and a mixed liquid crystal polymer of a nematic system and a cholesteric system is able to be used as the liquid crystal polymer described above. It is preferable that a glass transition temperature is 30° C. to 150° C. from the viewpoint of handleability or the like.

The cholesteric liquid crystal layer is able to be formed by a suitable method such as a method of performing direct coating with respect to a polarization separating plate, as necessary, through a suitable alignment film such as an oblique vapor deposition layer of polyimide, polyvinyl alcohol, or SiO, a method of performing coating with respect to a support formed of a transparent film which does not deteriorate by an alignment temperature of a liquid crystal polymer, as necessary, through an alignment film. For example, the transparent substrate described above is able to be used as the support, and a support having maximally small retardation is preferably used from the viewpoint of preventing the state of polarized light from being changed. In addition, a method of superposing a cholesteric liquid crystal layer through an alignment film, and the like are also able to be adopted.

Furthermore, the liquid crystal polymer is able to be applied by a method or the like of developing a liquid material such as a solution containing a solvent or a melting liquid obtained by heating according to a suitable method such as a roll coating method, a gravure printing method, or a spin coating method. The thickness of the cholesteric liquid crystal layer to be formed is preferably 0.5 to 100 μm from the viewpoint of preventing selective reflectivity, alignment disorder, a decrease in transmittance, and the like.

In addition, a dielectric multilayer film is able to be used in the light reflecting layer. A manufacturing method of the dielectric multilayer film using a film is not particularly limited, the dielectric multilayer film, for example, is able to be manufactured with reference to methods disclosed in JP3187821B, JP3704364B, JP4037835B, JP4091978B, JP3709402B, JP4860729B, JP3448626B, and the like, and the contents of the publications are incorporated in the present invention. Furthermore, the dielectric multilayer film is also referred to as a dielectric multilayer reflection polarizing plate or a birefringence interference polarizer of an alternate multilayer film. The dielectric multilayer film is able to selectively reflect a wavelength by adjusting the thickness and the refractive index of the film, and thus, is able to be used in this embodiment. In addition, there are many cases where the film reflects polarized light in a specific direction due to refractive index anisotropy, and thus, in such a case, it is preferable that two films are used to be orthogonal to each other since all of polarized light rays are able to be reflected. In addition to this, the dielectric multilayer film is able to be obtained by using an isotropic material in a structure where an inorganic film having a different refractive index is laminated and vapor-deposited, and this is disclosed in "Optical Waves in Layered Media" written by Yeh (published by Wiley-Interscience Publication).

In the dielectric multilayer film described above, it is preferable that the film thickness is thin, and the film thickness is preferably in a range of 5 to 100 μm, is more preferably in a range of 10 to 50 μm, and is even more preferably in a range of 5 to 20 μm.

[Manufacturing Method of Optical Conversion Member]

A manufacturing method of the optical conversion member of the present invention includes a step of forming the anisotropic light scattering layer by photocuring in which a curable compound is subjected to light irradiation.

In the manufacturing method of the optical conversion member of the present invention, it is preferable that the step of forming the anisotropic light scattering layer by the photocuring is a step (i) of performing light irradiation with respect to a composition containing a photocurable compound from an azimuth of greater than 0° and less than or equal to 60° from the normal direction of the surface of the anisotropic light scattering layer; or the step of forming the anisotropic light scattering layer by the photocuring is a step (ii) of performing light irradiation with respect to a composition containing a polymerizable liquid crystal compound.

First, in a case where the step of forming the anisotropic light scattering layer by the photocuring is the step (i) of performing the light irradiation with respect to the composition containing the photocurable compound from the azimuth of greater than 0° and less than or equal to 60° from the normal direction of the surface of the anisotropic light scattering layer, various components such as a binder resin, which configure the anisotropic light scattering layer, and a preparation method of the anisotropic light scattering layer will be described.

It is preferable that the anisotropic light scattering layer described above is formed by performing the light irradiation with respect to the composition containing the photocurable compound from the azimuth of greater than 0° and less than or equal to 60° from the normal direction of the surface of the anisotropic light scattering layer, and by curing the composition. According to this, it is possible to simply manufacture the anisotropic light scattering layer having anisotropic light scattering properties described above, preferably the anisotropic light scattering layer having anisotropic light scattering properties in all azimuths. Furthermore, in a case where the sectional surface of the anisotropic light scattering layer formed by curing the composition described above is observed with a microscope, for example, there is a case where a structure extending in an oblique direction is observed. In this case, it is considered that a plurality of fine rod-like curing regions of which the refractive index is slightly different from that of the peripheral region are formed in the anisotropic light scattering layer. It is considered that the fine rod-like curing region has different scattering properties with respect to an angle of incidence light, and thus, the anisotropic light scattering properties are exhibited.

Examples of an embodiment of the composition containing the photocurable compound described above include:

(A) an embodiment of a single photopolymerizable compound;

(B) an embodiment where a plurality of photopolymerizable compounds are mixed; and (C) an embodiment where only one or a plurality of photopolymerizable compounds and a polymer resin not having photopolymerizability are mixed. According to the embodiments of (A) to (C) described above, as described above, a micron order fine structure (the rod-like curing region) having a refractive index which is different from that of the peripheral region is formed in the anisotropic light scattering layer due to light irradiation, and thus, it is considered that incidence angle dependency of the amount of linearly transmission light described above is able to be exhibited.

Therefore, it is preferable that the single photopolymerizable compound in the embodiments of (A) and (C) described above has a great change in the refractive index before and after photopolymerization. In addition, it is preferable that the plurality of photopolymerizable compounds in the embodiments of (B) and (C) described above are in a combination having different refractive indices after curing. Further, it is preferable that the photopolymerizable compound and the polymer resin not having photopolymerizability in the embodiment of (C) described above are in a combination having different refractive indices after each curing. Furthermore, the change in the refractive index and the difference in the refractive index described above are preferably greater than or equal to 0.01, are more preferably greater than or equal to 0.05, and are even more preferably greater than or equal to 0.10, from the viewpoint of further reducing visual angle dependency of a tint.

Further, it is preferable that the photocurable compound described above contains a photopolymerizable compound (a radical polymerizable compound or a cationic polymerizable compound) of a polymer, an oligomer, or a monomer having a radical polymerizable or cationic polymerizable functional group, and a photoinitiator, and is irradiated with an ultraviolet ray and/or a visible light ray, and thus, has polymerization and curing properties.

The radical polymerizable compound described above mainly contains one or more unsaturated double bonds in the molecules, and specifically, examples of the radical polymerizable compound include an acrylic oligomer referred to as epoxy acrylate, urethane acrylate, polyester acrylate, silicone acrylate, and the like, and an acrylate monomer such as 2-ethyl hexyl acrylate, phenoxy ethyl acrylate, isonorbornyl acrylate, 2-hydroxy ethyl acrylate, 2,2,2-trifluoroethyl methacrylate, 2-perfluorooctyl-ethyl acrylate, triethylene glycol diacrylate, 1,6-hexanediol diacrylate, 1,9-nonanediol diacrylate, trimethylol propane triacrylate, ethylene oxide (EO)-modified trimethylol propane triacrylate, pentaerythritol triacrylate, pentaerythritol tetraacrylate, and dipentaerythritol hexaacrylate.

A compound containing one or more epoxy groups, vinyl ether groups, and/or oxetane groups in the molecules is able to be used as the cationic polymerizable compound described above. Examples of the compound containing the epoxy group in the molecules described above include diglycidyl ethers of bisphenols such as bisphenol A, hydrogenated bisphenol A, bisphenol F, bisphenol AD, bisphenol S, tetramethyl bisphenol A, tetramethyl bisphenol F, tetrachlorobisphenol A, and tetrabromobisphenol A, polyglycidyl ethers of a novolak resin such as phenol novolak, cresol novolak, brominated phenol novolak, and orthocresol novolak, diglycidyl ethers of alkylene glycolssuch as ethylene glycol, butanediol, 1,6-hexanediol, neopentyl glycol, trimethylol propane, and an ethylene oxide (EO) adduct of bisphenol A, glycidyl esters such as glycidyl ester of a hexahydrophthalic acid and diglycidyl ester of a dimer acid, and the like. Further, an alicyclic epoxy compound such as 3,4-epoxy cyclohexane methyl-3',4'-epoxy cyclohexyl carboxylate, an oxetane compound such as 1,4-bis[(3-ethyl-3-oxetanyl methoxy) methyl] benzene and 3-ethyl-3-(hydroxy methyl)-oxetane, a vinyl ether compound such as diethylene glycol divinyl ether and trimethylol propane trivinyl ether, and the like are also able to be used.

Among them, the photopolymerizable compound described above is preferably the radical polymerizable compound, and is more preferably an acrylate oligomer or an acrylate monomer.

However, the photopolymerizable compound described above is not limited to the examples described above. In addition, in order to obtain a sufficient different in the refractive index, a fluorine atom (F) for a low refractive index may be introduced into the photopolymerizable compound described above, and a sulfur atom (S), a bromine atom (Br), and various metal atoms for a high refractive index may be introduced into the photopolymerizable compound described above. In addition, in order to attain a high refractive index of the anisotropic diffusion layer described above, it is also effective that functional ultrafine particles in which a photopolymerizable functional group such as an acrylic group or an epoxy group is introduced onto the surface of ultrafine particles formed of metal oxide having a high refractive index such as titanium oxide ($TiO_2$), zirconium oxide ($ZrO_2$), and tin oxide ($SnO_x$) are added to the photopolymerizable compound.

Examples of the photoinitiator which is able to polymerize the radical polymerizable compound described above include benzophenone, 2,4-diethyl thioxanthone, benzoin isopropyl ether, 2,2-diethoxy acetophenone, benzyl dimethyl ketal, 2,2-dimethoxy-1,2-diphenyl ethan-1-one, 2-hydroxy-2-methyl-1-phenyl propan-1-one, 1-hydroxy cyclohexyl phenyl ketone, 2-methyl-1-[4-(methyl thio) phenyl]-2-morpholinopropanone-1, 1-[4-(2-hydroxy ethoxy)-phenyl]-2-hydroxy-2-methyl-1 1-propan-1-one, bis (cyclopentadienyl)-bis(2,6-difluoro-3-(pyl-1-yl) titanium, 2-benzyl-2-dimethyl amino-1-(4-morpholinophenyl)-butanone-1,2,4,6-trimethyl benzoyl diphenyl phosphine oxide, and the like.

The photoinitiator which is able to polymerize the cationic polymerizable compound described above is a compound which generates an acid by light irradiation, and is able to polymerize the cationic polymerizable compound described above by the generated acid, and in general, an onium salt and a metallocene complex are preferable used. A diazonium salt, a sulfonium salt, an iodonium salt, a phosphonium salt, a selenium salt, and the like are used as the onium salt, and in counter ions thereof, anions such as a tetrafluoroboric acid ion ($BF_4^-$), a hexafluorophosphoric acid ion ($PF_6^-$), a hexafluoroarsenic acid ion ($AsF_6^-$), and a hexafluoroantimonic acid ion ($SbF_6^-$) is used. Examples of the photoinitiator of the cationic polymerizable compound include triphenyl sulfonium hexafluoroantimonate, triphenyl sulfonium hexafluorophosphate, (4-methoxy phenyl) phenyl iodonium hexafluoroantimonate, bis(4-t-butyl phenyl) iodonium hexafluorophosphate, ($\eta$5-isopropyl benzene) ($\eta$5-cyclopentadienyl) iron (II) hexafluorophosphate, and the like.

It is preferable that the photoinitiator described above is formulated in the amount of greater than or equal to 0.01 parts by mass and less than or equal to 10 parts by mass, with respect to 100 parts by mass of the photopolymerizable compound. In a case where the photoinitiator described above is less than 0.01 parts by mass, photocurability decreases, and in a case where the photoinitiator described above is greater than 10 parts by mass, only the surface is cured, and internal curability decreases. The photoinitiator described above is more preferably formulated in the amount of greater than or equal to 0.1 parts by mass and less than or equal to 7 parts by mass, and is even more preferably formulated in the amount of greater than or equal to 0.1 parts by mass and less than or equal to 5 parts by mass, with respect to 100 parts by mass of the photopolymerizable compound.

Examples of the polymer resin not having photopolymerizability in the embodiment of (C) described above (C) include an acrylic resin, a styrene resin, a styrene-acrylic copolymer, a polyurethane resin, a polyester resin, an epoxy resin, a cellulose-based resin, a vinyl acetate-based resin, a vinyl chloride-vinyl acetate copolymer, a polyvinyl butyral resin, and the like. It is preferable that the polymer resin has sufficient compatibility with the photopolymerizable compound before photopolymerization, and in order to ensure such compatibility, various organic solvents, plasticizers, or the like are able to be used. Furthermore, in a case where acrylate is used as the photopolymerizable compound, it is preferable that the polymer resin is selected from the acrylic resin from the viewpoint of compatibility. Furthermore, "acryl" described above is used as the concept indicating acryl, methacryl, and acryl and methacryl, and the same applies to acrylate.

A method of curing the composition described above is not particularly limited, and examples of the method of curing the composition described above include a method in which the composition described above is applied onto a substrate into the shape of a sheet, and is irradiated with a parallel light ray (an ultraviolet ray or the like) from an azimuth of greater than 0° and less than or equal to 60° from the normal direction of the surface of the anisotropic light scattering layer. Accordingly, it is possible to form an aggregate of a plurality of rod-like curing regions extending in parallel to an irradiation direction of the parallel light ray. The azimuth of the light irradiation is preferably an azimuth of greater than 0° and less than or equal to 60° from the normal direction of the surface of the anisotropic light scattering layer, is more preferably an azimuth of 5° to 50° from the normal direction of the surface of the anisotropic light scattering layer, and is particularly preferably an azimuth of 15° to 45° from the normal direction of the surface of the anisotropic light scattering layer.

A general coating method (coating) or printing method is able to be used as a method of applying the composition described above onto the substrate into the shape of a sheet. Specifically, a coating method such as air doctor coating, bar coating, blade coating, knife coating, reverse roll coating, transfer roll coating, gravure roll coating, kiss roll coating, cast coating, spray coating, slot orifice coating, calendar coating, dam coating, dip coating, and die coating, and a printing method such as intaglio printing such as gravure printing, and stencil printing such as screen printing are able to be used. In addition, in a case where a viscosity of the composition described above is low, a method is able to be used in which a structure having a predetermined height is disposed around the substrate, and a region surrounded by the structure is coated with a liquid composition.

In general, a short are ultraviolet ray lamp is used as a light source which is used for performing irradiation of the parallel light ray described above (an ultraviolet ray or the like), and specifically, a high pressure mercury lamp, a low pressure mercury lamp, a metal halide lamp, a xenone lamp, and the like are able to be used. A device which is used for performing irradiation of the parallel light ray (an ultraviolet ray or the like) from a predetermined direction is not particularly limited, and an exposure device for resist exposure is preferably used from the viewpoint of enabling irradiation of a parallel ultraviolet ray having an even intensity in a certain area to be performed and selection from commercially available devices to be performed. Further-more, in a case where an anisotropic light scattering layer having a small size is formed, a method is able to be used in which an ultraviolet ray spot light source is used as a point light source, and irradiation is performed from a sufficiently separate distance.

It is necessary that the parallel light ray to be emitted in order to form the composition described above into the shape of a sheet has a wavelength which is able to polymerize and cure the photopolymerizable compound, and in general, a light ray having a wavelength based on 365 nm of a mercury lamp is used. In a case where the anisotropic light scattering layer is formed by using a light ray in this wavelength range, it is preferable that irradiance is greater than or equal to 0.01 mW/cm$^2$ and less than or equal to 100 mW/cm$^2$. In a case where the irradiance is less than 0.01 mW/cm$^2$, curing is required to be performed for a long period of time, and thus, a production efficiency deteriorates, and in a case where the irradiance is greater than 100 mW/cm$^2$, the curing of the photopolymerizable compound is excessively accelerated, and thus, a structure is not formed, and desired anisotropic light scattering properties are not able to be exhibited. It is more preferable that the irradiance described above is greater than or equal to 0.1 mW/cm$^2$ and less than or equal to 20 mW/cm$^2$.

An anisotropic scattering layer manufactured by a method which is not in the range of the manufacturing method of the optical conversion member of the present invention may be used, and for example, an anisotropic scattering layer may be formed by using a known manufacturing method of an optical conversion member, such as a method using two types of non-compatible resins as described below. A layer in which at least two types of non-compatible resins are used, and a sea-island structure including an island phase arranged on at least a surface layer portion of a film in the shape of a rod in one direction is formed in the film is also preferably used as the anisotropic light scattering layer described above.

In this case, the resin to be used is a transparent resin having visible light transmittance of greater than or equal to 80% in a single body, and examples of the transparent resin include an olefin-based resin such as low density polyethylene, polypropylene, polymethyl pentene, and a norbornene resin, a polyamide resin such as 6 nylon and 66 nylon, a polyester resin such as polyethylene terephthalate, polyethylene naphthalate, polytrimethylene terephthalate, and polybutylene terephthalate, an acrylic resin such as polymethylene methacrylate, a styrene-based resin such as polystyrene and a polystyrene-methyl methacrylate copolymer, a polycarbonate resin, and the like. Furthermore, in the present invention, the "visible light" indicates light in a wavelength range of 380 nm to 780 nm.

A combination of non-compatible resins in which a phase separation structure is a sea-island structure is selected from the transparent resins and used as a preferred example. In the transparent resins described above, examples of the combination of the non-compatible resins in which the phase separation structure is the sea-island structure include various combination between an olefin-based resin and a polyester resin, an olefin-based resin and a polyamide resin, an olefin-based resin and polycarbonate, a styrene-based resin and polycarbonate, and the like. The styrene-based resin is preferably greater than 50 mass %, and is more preferably greater than or equal to 60 mass %.

Further, among the combination of the non-compatible resins, a combination of resins in which an island phase arranged in the shape of a rod in one direction is formed at the time of being molded into a film is preferably selected and used. When a film is molded from a non-compatible raw material resin, examples of a method of forming the island phase arranged in the shape of a rod in one direction include a method in which when a resin having the highest melting point is selected from the combinations of the non-compatible resins, is processed into the shape of a rod, is mixed with a residual resin, and is set to a raw material resin, and the raw material resin is molded into a film by a method such as melting molding using an extruder or the like, a film is molded by setting a melting molding temperature of the extruder or the like to a temperature lower than a melting point of the resin which is processed into the shape of a rod, and thus, the film retaining the shape of the resin which is molded into the shape of a rod is molded, and then, the film is stretched in one direction, and therefore, a rod-like island phase arranged in the film in one direction is prepared.

Examples of other methods include a method in which when a raw material resin mixed with a non-compatible resin is melted and kneaded by using an extruder and is extruded into the shape of a plate from a sheet die or the like, and then, the resin is cooled and solidified, and thus, a film is molded, phase separation is performed while the resin extruded from the extruder is cooled, one resin in the film is formed as an approximately spherical island phase, and then, the film expands in one direction by being interposed between nip rollers or the like until the entire resin is completely cooled and solidified, and thus, the island phase in the film is changed into the shape of a rod and is aligned in an expansion direction, a method in which when a melted resin is extruded to a fine tube or a slit portion of a die from an extruder, a large shear force is applied to the resin to flow, and thus, an island phase is changed into the shape of a rod and is aligned in a flowing direction, and the like.

Next, a case where the step of forming the anisotropic light scattering layer by the photocuring is the step (ii) of performing the light irradiation with respect to the composition containing the polymerizable liquid crystal compound will be described.

The anisotropic light scattering layer includes a liquid crystal compound layer in which a liquid crystal compound is applied onto an arbitrary support (examples of the support includes the transparent substrate described above, and the support may be included in the optical conversion member of the present invention, or may be removed therefrom) or an arbitrary underlayer such as other functional layers (the underlayer may be included in the optical conversion member of the present invention, or may be removed therefrom), a repeating pattern having a pitch p between the liquid crystal compounds of preferably 0.35 to 3 μm is formed towards the surface of the anisotropic light scattering layer in at least one direction, and specifically, the repeating pattern is formed in a direction of preferably 30° to 60° with respect to the normal direction of the surface of the anisotropic light scattering layer. In addition, it is preferable that a thickness t of the liquid crystal compound layer is 0.17 to 10 μm.

The pitch p between the liquid crystal compounds is preferably 0.35 to 3 μm, is more preferably 1.0 to 2.5 μm, and is particularly preferably 1.5 to 2.5 μm.

The thickness t of the liquid crystal compound layer is preferably 0.17 to 10 μm, and is more preferably 1.0 to 2.5 μm.

A refractive index no of the liquid crystal compound is preferably 1.4 to 1.7, and is more preferably 1.45 to 1.65. A refractive index ne is preferably 1.4 to 1.7, and is more preferably 1.5 to 1.65.

A difference between the refractive index ne and the refractive index no (a refractive index difference) is preferably greater than or equal to 0.045, and is more preferably greater than or equal to 0.05.

In general, the liquid crystal compound is able to be classified into a rod-like liquid crystal compound and a disk-like liquid crystal compound according to the shape thereof. Further, there are a low molecular type and a high molecular type in each of the rod-like liquid crystal compound and the disk-like liquid crystal compound. In general, the high molecular indicates that a degree of polymerization is greater than or equal to 100 (Polymer Physics. Phase Transition Dynamics, written by Doi MASAO, p. 2, published by Iwanami Shoten, Publishers, 1992). In the present invention, any liquid crystal compound is able to be used.

Hereinafter, an embodiment using a disk-like (discotic) liquid crystal compound will be described as an embodiment (1) of the anisotropic light scattering layer using the liquid crystal compound, and an embodiment using a rod-like liquid crystal compound will be described as an embodiment (2) of the anisotropic light scattering layer using the liquid crystal compound. Furthermore, the rod-like liquid crystal compound is also referred to as RLC, and the disk-like liquid crystal compound is also referred to as DLC.

<Embodiment (1) of Anisotropic Light Scattering Layer Using Liquid Crystal Compound>

The embodiment (1) of the anisotropic light scattering layer using the liquid crystal compound is an embodiment using the disk-like liquid crystal compound as the liquid crystal compound.

Examples of the disk-like liquid crystal compound include a benzene derivative disclosed in research reports of C. Destrade et al., Mol. Cryst. Vol. 71, p. 111 (1981), a truxene derivative disclosed in research reports of C. Destrade et al., Mol. Cryst. Vol. 122, p. 141 (1985) and Physics lett, A, Vol. 78, p. 82 (1990), a cyclohexane derivative disclosed in of research reports of B. Kohne et. al, Angew. Chem. Vol. 96, p, 70 (1984), and azacrown-based or phenyl acetylene-based macrocycle disclosed in research reports of J. M. Lehn et al., J. Chem. Commun., p. 1794 (1985) and research reports of J. Zhang et al., J. Am. Chem. Soc. Vol. 116, p. 2655 (1994).

It is also preferable that the liquid crystal compound has two or more types of reactive groups having different polymerization conditions. In this case, only a part of a plurality of types of reactive groups is polymerized by selecting the conditions, and thus, a layer containing a polymer having an unreacted reactive group is able to be prepared. The polymerization conditions to be used may be a wavelength range of ionizing radiation which is used in polymerization and immobilization, or may be a difference in polymerization mechanisms to be used, and preferably, may be a combination between a radical reaction group and a cationic reaction group, which is able to be controlled according to the type of initiator to be used. A combination in which the radical reactive group is an acrylic group and/or a methacrylic group, and the cationic group is a vinyl ether group, an oxetane group and/or an epoxy group is particularly preferable since reactivity is easily controlled.

(Disk-Like Liquid Crystal Compound Having Polymerizable Group)

As described above, a compound having a polymerizable group is preferable as the disk-like liquid crystal compound which is able to use the anisotropic light scattering layer using the liquid crystal compound as a main raw material.

A compound denoted by General Formula (I) described below is preferable as the disk-like liquid crystal compound.

$$D(\text{-L-E-Q})_n \qquad \text{General Formula (I):}$$

In the formula, D represents a disk-like core, L represents a divalent linking group, E represents a divalent aromatic ring or a heterocyclic ring, Q represents a polymerizable group, and n represents an integer of 3 to 12.

The disk-like core (D) is preferably a benzene ring, a naphthalene ring, a triphenylene ring, an anthraquinone ring, a truxene ring, a pyridine ring, a pyrimidine ring, and a triazine ring, and is particularly preferably a benzene ring, a triphenylene ring, a pyridine ring, a pyrimidine ring, and a triazine ring.

L is preferably a divalent linking group selected from the group consisting of *—O—CO—, *—CO—O—, *—CH=CH—, *—C≡C—, and a combination thereof, and is particularly preferably a divalent linking group having at least one of *—CH=CH— or *—C≡C—. Here, * represents a position bonded to D in General Formula (I).

In E, the aromatic ring is preferably a benzene ring and a naphthalene ring, and is particularly preferably a benzene ring. The heterocyclic ring is preferably a pyridine ring and a pyrimidine ring, and is particularly preferably a pyridine ring. H is particularly preferably an aromatic ring.

It is preferable that a polymerization reaction of the polymerizable group Q is addition polymerization (including ring-opening polymerization) or condensation polymerization. In other words, it is preferable that the polymerizable group is a functional group which is able to perform an addition polymerization reaction or a condensation polymerization reaction. In particular, a (meth)acrylate group and an epoxy group are preferable.

it is particularly preferable that the disk-like liquid crystal compound denoted by General Formula (I) is described below is a disk-like liquid crystal denoted by General Formula (II).

General Formula (II)

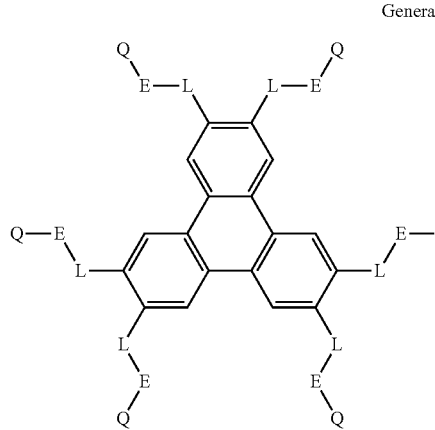

In the formula, L, E, and Q are each identical to L, E, and Q in General Formula (I), and preferred ranges thereof are also identical to those of L, E, and Q in General Formula (I).

As shown in General Formulas (I), (II), and (IV) described below, the disk-like liquid crystal compound having a plurality of aromatic rings in the molecules causes an intermolecular π-π mutual interaction with respect to an onium salt such as a pyridinium compound or an imidazolium compound which is used as an alignment control agent, and thus, is able to realize vertical alignment. In particular, for example, in General Formula (II), in a case where L is a divalent linking group having at least one of *—CH=CH— or *—C≡C—, and in General Formula (IV), in a case where a plurality of aromatic rings and heterocyclic rings are linked by a single bond, free rotation of bonding is strongly restrained by the linking group, and thus, linearity of the molecules are retained, and therefore, liquid crystallinity is improved, a stronger intermolecular π-π mutual interaction occurs, and stable vertical alignment is able to be realized.

A compound denoted by General Formula (IV) described below is preferable as the disk-like liquid crystal compound.

General Formula (IV)

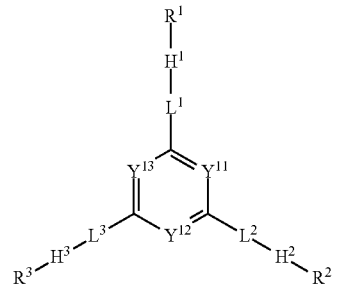

In the formula, $Y^{11}$, $Y^{12}$, and $Y^{13}$ each independently represent methine or a nitrogen atom which may be substituted; $L^1$, $L^2$, and $L^3$ each independently represent a single bond or a divalent linking group; $H^1$, $H^2$, and $H^3$ each independently represent a group denoted by General Formula (I-A) or (I-B); and $R^1$, $R^2$, and $R^3$ each independently represent General Formula (I-R) described below;

General Formula (I-A)

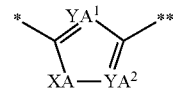

In General Formula (I-A), $YA^1$ and $YA^2$ each independently represent methine or a nitrogen atom; XA represents an oxygen atom, a sulfur atom, methylene, or imino; * represents a position bonded to an $L^1$ side to an $L^3$ side in General Formula (IV) described above; and ** represents a position bonded to an $R^1$ side to an $R^3$ side General Formula (IV) described above;

General Formula (I-B)

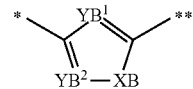

In General Formula (I-B), $YB^1$ and $YB^2$ each independently represent methine or a nitrogen atom; XB represents an oxygen atom, a sulfur atom, methylene, or imino; * represents a position bonded to an $L^1$ side to an $L^3$ side in General Formula (IV) described above; and ** represents a position bonded to an $R^1$ side to an $R^3$ side in General Formula (IV) described above;

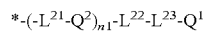  General Formula (I-R)

In General Formula (I-R), * represents a position bonded to an $H^1$ side to an $H^3$ side in General Formula (IV); $L^{21}$ represents a single bond or a divalent linking group; $Q^2$ represents a divalent group (a cyclic group) having at least one type of cyclic structure; n1 represents an integer of 0 to 4; $L^{22}$ represents —O—, —O—CO—, —CO—O—, —O—CO—O—, —S—, —NH—, **—SO$_2$—,

—CH$_2$—, —CH=CH—, or **—C≡C—; L$^{23}$ represents a divalent linking group selected from the group consisting of —O—, —S—, —C(=O)—, —SO$_2$—, —NH—, —CH$_2$—, —CH=CH—, —C≡C—, and a combination thereof; and Q$^1$ represents a polymerizable group or a hydrogen atom.

A preferred range of each sign of a 3-substituted benzene-based disk-like liquid crystal compound denoted by General Formula (IV), and a specific example of the compound of General Formula (IV) can be referred to the description in paragraphs [0013] to [0077] of JP2010-244038A. Here, the disk-like liquid crystal compound which is able to be used in the present invention is not limited to the 3-substituted benzene-based disk-like liquid crystal compound of General Formula (IV).

Examples of the triphenylene compound include a compound disclosed in paragraphs [0062] to [0067] of JP2007-108732A, and the like, but the present invention is not limited thereto.

It is preferable that a director of the disk-like liquid crystal compound contained in the anisotropic light scattering layer using the liquid crystal compound is tilted at an angle θ of ±30 to ±40° from the normal direction with respect to the film surface of the anisotropic light scattering layer, has the same absolute value of a tilt angle, alignment patterns having different positive-negative signs, that is, an alignment pattern having an angle of + and an alignment pattern having angle of − which is identical to the angle of + are alternately repeated.

The tilt angle of the director is able to be measured as described below.

The angle of the director is able to be measured by a method in which a sectional surface which is cut in a vertical direction with respect to the film surface by a microtome is observed and measured by a polarizing microscope, or from Re (λ), Rth (λ), and a slow axis which are able to be measured by KOBRA 21ADH or WR.

(Measurement of Tilt Angle Using KOBRA)

In an optically anisotropic layer in which a liquid crystal compound is aligned, it is difficult to directly and accurately measure a tilt angle (an angle between a physical target axis of the liquid crystal compound and the interface of the optically anisotropic layer is a tilt angle) θ of a monoaxis tilt of the optically anisotropic layer. Therefore, herein, θ is calculated by the following method. This method does not accurately exhibit an actual alignment state of the present invention, but is effective as means indicating a relative relationship of a part of optical properties of an optical film.

A specific calculation method is as described below.

(Step 1) In a plane where a tilt angle of each layer is monotonously changed by a linear function along a thickness direction of the optically anisotropic layer, an incidence angle of measurement light with respect to the optically anisotropic layer is changed, and a retardation value is measured at three or more measurement angles. In order to simplify measurement and calculation, it is preferable that the normal direction with respect to the optically anisotropic layer is 0°, and the retardation value is measured at three measurement angles of −40°, 0°, and +40°. Such measurement is able to be performed by KOBRA-21ADH and KOBRA-WR (manufactured by Oji Scientific Instruments Co., Ltd.), a transmission type ellipsometer AEP-100 (manufactured by SHIMADZU CORPORATION), M150 and M520 (manufactured by JASCO Corporation), and ABR OA (manufactured by Uniopt Co., Ltd.).

(Step 2) In the model described above, a refractive index of ordinary light of each layer is no, a refractive index of extraordinary light is ne (ne is the same value in each of all layers, and the same applies to no), and a thickness of an entire multilayer body is d. Further, on the basis of an assumption in which a tilt direction in each layer is coincident with an optical axis direction of one axis of the layer, such that calculation of angle dependency of the retardation value of the optically anisotropic layer is coincident with a measured value, fitting is performed by using the tilt angle θ of the optically anisotropic layer as a variable, and θ is calculated.

Here, know values such as a literature value and a catalog value are able to be used as no and ne. In a case where the value is unknown, no and ne are able to be measured by using an ABBE's refractometer. The thickness of the optically anisotropic layer is able to be measured by an optical interference film thickness meter, a sectional surface picture of a scanning type electron microscope, and the like.

In the anisotropic light scattering layer using the liquid crystal compound of the embodiment (1), an alignment control agent, an unevenness inhibitor, a cissing inhibitor, a polymerization initiator, a polymerizable monomer, a plasticizer, a surfactant, a polymerizable monomer, and the like are used together in addition to the liquid crystal compound, and thus, evenness of a coated film, strength of the film, alignment properties of liquid crystal molecules, and the like are able to be improved. An additive which has compatibility with the liquid crystal molecules is obtained, changes a tilt angle of the liquid crystal molecules, or does not inhibit the alignment is preferable. Specifically, additives disclosed in JP2002-296423A, JP2001-330725A, JP2000-155216A, and the like are preferable.

(Alignment Film of Embodiment (1))

In the embodiment (1), in order to set the liquid crystal compound to be in an even alignment state, it is preferable that an alignment film is arranged between the underlayer such as the support and the anisotropic light scattering layer using the liquid crystal compound. The alignment film may be either a rubbing alignment film or a photoalignment film, and it is preferable that the photoalignment film is used.

The photoalignment film indicates an alignment film in which an alignment restricting force is exhibited by light irradiation. A photoalignment polymer having a photoreactive group is preferable as a photoalignment material which is used in the photoalignment film. Here, the "photoreactive group", for example, indicates a functional group which causes a change in a chemical structure of a functional group or an alignment state of molecules having the functional group due to light irradiation from a single direction, and thus, is able to align molecules of the liquid crystal compound arranged on the surface of the alignment in a predetermined direction. Specifically, examples of the photoalignment material include an azobenzene derivative, a cinnamic acid derivative, a chalcone derivative, stilbenes, a styryl pyridine derivative, α-hydrazono-β-ketoesters, a coumarin derivative, benzylidene phthalimidines, a retinoic acid derivative, spiropyrans, spirooxazines, an anthracene derivative, a benzophenone derivative, polyimide, and the like. Among them, the coumarin derivative, the styryl pyridine derivative, the azobenzene derivative, the cinnamic acid derivative, and the chalcone derivative are preferable, and the azobenzene derivative, the cinnamic acid derivative, and the chalcone derivative are more preferable.

The photoalignment material may be a low molecular compound or a polymer. The type of the polymer described above may be any polymer type disclosed in "Revised Edition: Chemistry of Polymer Synthesis" (written by Otsu TAKAYUKI and published by Kagaku-Dojin Publishing Company, INC, 1968) pp. 1 to 4, and example of the polymer include polyolefins, polyesters, polyamides, polyimides, polyurethanes, polycarbonates, polysulfones, polyethers, polyacetals, polyketones, polyphenylene oxides, polyphenylene sulfides, polyarylates, polytetrafluoroethylenes (PTFEs), polyvinylidene fluorides, a cellulose derivative, and the like. The polyolefins are preferable.

The photoalignment material is disclosed in many literatures. In the alignment film of the present invention, preferred examples of the photoalignment material include an azo compound disclosed in JP2006-285197A, JP2007-76839A, JP2007-138138A, JP2007-94071A, JP2007-121721A, JP2007-140465A, JP2007-156439A, JP2007-133184A, JP2009-109831A, and JP3883848B, JP4151746B, an aromatic ester compound disclosed in JP2002-229039A, maleimide and/or an alkenyl-substituted nadiimide compound having a photoalignment unit disclosed in JP2002-265541A and JP2002-317013A, a photo-cross-linkable silane derivative disclosed in JP4205195B and JP4205198B, photocross-linkable polyimide disclosed in JP2003-520878A, JP2004-529220A, and JP4162850B, polyamide, or ester. The azo compound, the photocross-linkable polyimide, the polyamide, or the ester is more preferable.

(Formation of Anisotropic Light Scattering Layer Using Liquid Crystal Compound)

The anisotropic light scattering layer using the liquid crystal compound is able to be formed by preparing a composition containing at least one type of liquid crystal compound, for example, as a coating liquid, and by applying the coating liquid onto the surface of the alignment film, and a coating method is not particularly limited.

In an example of a formation method of the anisotropic light scattering layer using the liquid crystal compound of the embodiment (1), the anisotropic light scattering layer is able to be formed by allowing the photoalignment film to exhibit alignment capabilities different from each other by pattern exposure, and by forming a pattern photoalignment film.

Non-polarized light is exposed from a predetermined angle direction in a clockwise direction from the normal direction of a layer surface through a stripe-like mask, and non-polarized light is exposed from a predetermined angle direction (preferably the same angle as predetermined angle in the clockwise direction) in a counterclockwise direction, and thus, a pattern photoalignment film including a region in which alignment is performed at the predetermined angle in the clockwise direction and a region in which alignment is performed at the predetermined angle in the counterclockwise direction is able to be formed.

It is preferable that the non-polarized light applied to the photoalignment film is an ultraviolet ray. The irradiation energy is preferably in a range of 20 mJ/cm$^2$ to 50 J/cm$^2$, is more preferably in a range of 20 to 5000 mJ/cm$^2$, and is even more preferably in a range of 100 to 800 mJ/cm$^2$.

A light source which is used in non-polarized light irradiation is a light source which is generally used, and examples of the light source are able to include a lamp such as a tungsten lamp, a halogen lamp, a xenone lamp, a xenone flash lamp, a mercury lamp, a mercury xenone lamp, and a carbon arc lamp, various lasers (for example, a semiconductor laser, a helium neon laser, an argon ion laser, a helium cadmium laser, an YAG laser), a light emitting diode, a cathode ray tube, and the like.

In a case where a coating liquid for the anisotropic light scattering layer using the liquid crystal compound is applied onto the pattern photoalignment film, and the liquid crystal compound is aligned, the liquid crystal compound is aligned along a direction of alignment control capability of each pattern. This state is immobilized by light irradiation, and thus, the anisotropic light scattering layer using the liquid crystal compound is able to be formed.

It is preferable that an ultraviolet ray is used in light irradiation for polymerizing liquid crystal molecules. The irradiation energy is preferably in a range of 20 mJ/cm$^2$ to 50 J/cm$^2$, is more preferably in a range of 20 to 5000 mJ/cm$^2$, and is even more preferably in a range of 100 to 800 mJ/cm$^2$. In addition, in order to accelerate a photopolymerization reaction, the light irradiation may be performed under heating conditions.

<Embodiment (2) of Anisotropic Light Scattering Layer Using Liquid Crystal Compound>

The embodiment (2) is an embodiment using a rod-like liquid crystal compound as the liquid crystal compound.

The embodiment (2) is an embodiment in which a concave and convex portion is formed at each pitch p on the anisotropic light scattering layer using the liquid crystal compound, and thus, the anisotropic light scattering layer using the liquid crystal compound becomes a pattern liquid crystal compound layer 12A in which the rod-like liquid crystal compound forms a pattern in the shape of concavities and convexities. According to such an embodiment, light easily scatters. Furthermore, in the embodiment (2) of the anisotropic light scattering layer using the liquid crystal compound, the thickness of the liquid crystal compound layer is the height of a convex portion of the concave and convex portion which is formed by the rod-like liquid crystal compound.

Azomethines, azoxies, cyanobiphenyls, cyanophenyl esters, benzoic acid esters, cyclohexane carboxylic acid phenyl esters, cyanophenyl cyclohexanes, cyano-substituted phenyl pyrimidines, alkoxy-substituted phenyl pyrimidines, phenyl dioxanes, tolanes, and alkenyl cyclohexyl benzonitriles are preferably used as the rod-like liquid crystal compound. It is possible to use not only the low molecular liquid crystal compound as described above, but also a high molecular liquid crystal compound. The high molecular liquid crystal compound described above is a high molecular compound in which a rod-like liquid crystal compound having a low molecular reactive group is polymerized. The rod-like liquid crystal compound having the low molecular reactive group described above, which is particularly preferably used, is a rod-like liquid crystal compound denoted by General Formula (X) described below.

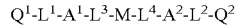

General Formula (X): $Q^1\text{-}L^1\text{-}A^1\text{-}L^3\text{-}M\text{-}L^4\text{-}A^2\text{-}L^2\text{-}Q^2$ In the formula, $Q^1$ and $Q^2$ each independently represent a reactive group, and $L^1$, $L^2$, $L^3$, and $L^4$ each independently represent a single bond or a divalent linking group. $A^1$ and $A^2$ each independently represent a spacer group having 2 to 20 carbon atoms. M represents a mesogen group.

Examples of the rod-like liquid crystal compound include compounds disclosed in JP1999-513019A (JP-H11-513019A), JP2007-279688A, and the like, but the present invention is not limited thereto.

The compound denoted by General Formula (X) is able to be synthesized by a method disclosed in JP1999-513019A (JP-H11-513019A) (WO97/00600A).

In the alignment, a tilt angle θ of a director of the rod-like liquid crystal compound is preferably less than or equal to ±10°, is more preferably less than or equal to ±80, is even more preferably less than or equal to ±5°, and is particularly preferably 0°.

In the coating liquid for forming the anisotropic light scattering layer using the liquid crystal compound described above, in order to set the angle of the director to 0° (in order to perform vertical alignment), it is preferable that an additive (an alignment control agent) accelerating alignment of liquid crystals is added, and examples of the additive include a compound disclosed in [0055] to [0063] of JP2009-223001A and a compound disclosed in [0023] to [0088] of JP2008-026730A. In addition, it is preferable that an alignment control agent described below is added.

the embodiment (2), the anisotropic light scattering layer is able to be formed by containing the photoacid generator in the rubbing alignment film, by exhibiting alignment capa-

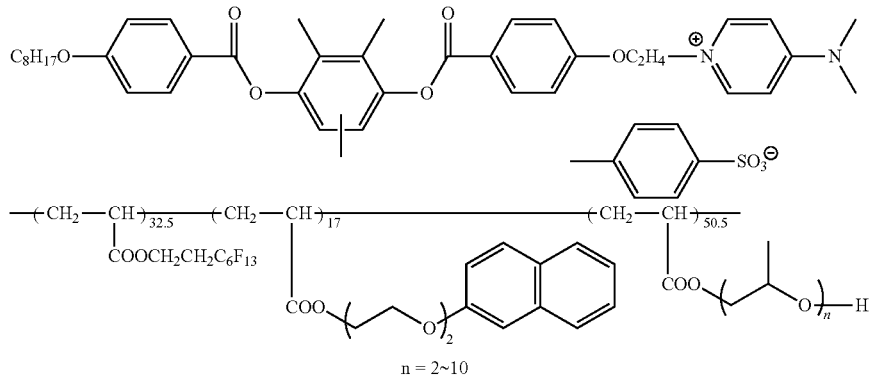

In the anisotropic light scattering layer using the liquid crystal compound of the embodiment (2), an alignment control agent, an unevenness inhibitor, a cissing inhibitor, a polymerization initiator, a polymerizable monomer, a plasticizer, a surfactant, a polymerizable monomer, and the like are used together in addition to the liquid crystal compound, and thus, evenness of a coated film, strength of the film, alignment properties of liquid crystal molecules, and the like are able to be improved. An additive which has compatibility with the liquid crystal molecules is obtained, changes a tilt angle of the liquid crystal molecules, or does not inhibit the alignment is preferable. Specifically, additives disclosed in JP2002-296423A, JP2001-330725A, JP2000-155216A, and the like are preferable.

(Alignment Film of Embodiment (2))

In the embodiment (2), in order to set the liquid crystal compound to be in an even alignment state, it is preferable that an alignment film is arranged between the underlayer such as the support and the anisotropic light scattering layer using the liquid crystal compound. The alignment film may be either a rubbing alignment film or a photoalignment film, and it is preferable that the photoalignment film is used.

An alignment film identical to an alignment film included in an optically anisotropic layer described below is able to be used as the rubbing alignment film.

In addition, the alignment film may contain a photoacid generator. The photoacid generator is a compound which is decomposed by light irradiation of an ultraviolet ray or the like, and generates an acidic compound. In a case where the photoacid generator is decomposed by light irradiation and generates the acidic compound, a change in alignment control capability of the alignment film occurs. Here, the change in the alignment control capability may be specified as a change in alignment control capability of a single alignment film, may be specified as a change in alignment control capability which is arranged by the alignment film, the additive contained in the composition for forming the optically anisotropic layer arranged on the alignment film, or may be specified as a combination thereof.

Examples of the photoacid generator which is able to be used in the present invention include a compound disclosed in Prog. Polym. Sci., Vol. 23, p. 1485 (1998). A pyridinium salt, an iodonium salt, and a sulfonium salt are particularly preferably used as the photoacid generator.

(Formation of Anisotropic Light Scattering Layer Using Liquid Crystal Compound)

In an example of a formation method of the anisotropic light scattering layer using the liquid crystal compound of bilities different from each other by pattern exposure, and by forming a pattern alignment film.

The rubbing alignment film is pattern-exposed through a stripe-like mask, and the photoacid generator is decomposed, and thus, a region in which the acidic compound is generated (an exposed portion) and a region in which the acidic compound is not generated (an unexposed portion) are formed.

It is preferable that irradiation light applied to the alignment film is an ultraviolet ray. The irradiation energy is preferably in a range of 20 mJ/cm$^2$ to 50 J/cm$^2$, is more preferably in a range of 20 to 5000 mJ/cm$^2$, and is even more preferably in a range of 100 to 800 mJ/cm$^2$.

A light source which is used in light irradiation is a light source which is generally used, and examples of the light source are able to include a lamp such as a tungsten lamp, a halogen lamp, a xenone lamp, a xenone flash lamp, a mercury lamp, a mercury xenone lamp, and a carbon arc lamp, various lasers (for example, a semiconductor laser, a helium neon laser, an argon ion laser, a helium cadmium laser, and a YAG laser), a light emitting diode, a cathode ray tube, and the like.

[Backlight Unit]

A backlight unit of the present invention includes at least the optical conversion member described above, and a light source. The details of the optical conversion member are identical to those described above.

(Light Emission Wavelength of Backlight Unit)

In order to realize higher brightness and higher color reproducibility by a three-wavelength light source, it is preferable that the backlight unit emits blue light having a light emission center wavelength in a wavelength range of 400 to 500 nm and a light emission intensity peak having a half-width of less than or equal to 100 nm, green light having a light emission center wavelength in a wavelength range of 500 to 600 nm and a light emission intensity peak having a half-width of less than or equal to 100 nm, and red light having a light emission center wavelength in a wavelength range of 600 to 680 nm and a light emission intensity peak having a half-width of less than or equal to 100 nm.

The wavelength range of the blue light emitted from the backlight unit is preferably 430 to 480 nm, and is more preferably 440 to 460 nm, from the viewpoint of further improving brightness and color reproducibility.

The wavelength range of the green light emitted from the backlight unit is preferably 500 to 550 nm, and is more preferably 510 to 540 nm, from the same viewpoint.

In addition, the wavelength range of the red light emitted from the backlight unit is preferably 600 to 650 nm, and is more preferably 610 to 640 nm, from the same viewpoint.

All of the half-widths of the respective light emission intensities of the blue light, the green light, and the red light emitted from the backlight unit are preferably less than or equal to 80 nm, are more preferably less than or equal to 50 nm, are even more preferably less than or equal to 45 nm, are still more preferably less than or equal to 40 nm, from the same viewpoint. Among them, it is particularly preferable that the half-width of each of the light emission intensity of the blue light is less than or equal to 30 nm.

The backlight unit includes at least the light source along with the optical conversion member described above. In one embodiment, a light source which emits blue light having a light emission center wavelength in a wavelength range of 430 nm to 480 nm, for example, a blue emitting diode emitting blue light is able to be used as the light source. In a case where the light source emitting the blue light is used, it is preferable that the optical conversion layer contains at least the quantum dot (A) emitting the red light which is excited by excitation light and the quantum dot (B) emitting the green light. Accordingly, it is possible to embody the white light by the blue light which is emitted from the light source and is transmitted through the optical conversion member, and the red light and the green light emitted from the optical conversion member.

Alternatively, in another embodiment, a light source which emits ultraviolet light having a light emission center wavelength in a wavelength range of 300 nm to 430 nm, for example, an ultraviolet light emitting diode is able to be used as the light source. In this case, it is preferable that the optical conversion layer contains the quantum dot (C) emitting the blue light which is excited by excitation light along with the quantum dots (A) and (B). Accordingly, it is possible to embody the white light by the red light, the green light, and the blue light emitted from the optical conversion member.

<Configuration of Backlight Unit>

The configuration of the backlight unit may be an edge light mode in which a light guide plate, a reflection plate, or the like is included as a configuration member. In FIG. 13, an example of an edge light mode backlight unit is illustrated, and the backlight unit according to one embodiment of the present invention may be a direct backlight mode. A known light guide plate is able to be used as the light guide plate without any limitation.

In addition, the backlight unit is also able to include a reflection member in the rear portion of the light source. Such a reflection member is not particularly limited, but known reflection members disclosed in JP3416302B, JP3363565B, JP4091978B, JP3448626B, and the like are able to be used, and the contents of the publications are incorporated in the present invention.

It is also preferable that the backlight unit includes a wavelength selective filter for a blue color which selectively transmits light having a wavelength shorter than 460 nm in the blue light.

In addition, it is also preferable that the backlight unit includes a wavelength selective filter for a red color which selectively transmits light having a wavelength longer than 630 nm in the red light. Such a wavelength selective filter for a blue color or a wavelength selective filter for a red color is disclosed in JP2008-52067A or the like, and the contents of the publication are incorporated in the present invention.

In addition, it is also preferable that the backlight unit includes a known diffusion plate or diffusion sheet, a known prism sheet (for example, BEF series or the like manufactured by Sumitomo 3M Ltd.), and a known light guide device. The other members are disclosed in JP3416302B, JP3363565B, JP4091978B, JP3448626B, and the like, and the contents of the publications are incorporated in the present invention.

[Liquid Crystal Display Device]

The liquid crystal display device of the present invention includes at least the backlight unit described above, and a liquid crystal cell.

<Configuration of Liquid Crystal Display Device>

The driving mode of the liquid crystal cell is not particularly limited, and various modes such as a twisted nematic (TN) mode, a super twisted nematic (STN) mode, a vertical alignment (VA) mode, an in-plane switching (IPS) mode, and an optically compensated bend cell (OCB) mode are able to be used. It is preferable that the liquid crystal cell is in the VA mode, the OCB mode, the IPS mode, or the TN mode, but the liquid crystal cell is not limited thereto. The configuration illustrated in FIG. 2 of JP2008-262161A is exemplified as the configuration of the liquid crystal display device in the VA mode. However, the specific configuration of the liquid crystal display device is not particularly limited, and a known configuration is able to be adopted.

In one embodiment of the liquid crystal display device, the liquid crystal display device includes a liquid crystal cell in which a liquid crystal layer is interposed between facing substrates of which at least one includes an electrode, and the liquid crystal cell is configured by being arranged between two polarizing plates. The liquid crystal display device includes the liquid crystal cell in which a liquid crystal is sealed between upper and lower substrates, changes the alignment state of the liquid crystal by applying a voltage, and thus, displays an image. Further, as necessary, the liquid crystal display device includes an associated functional layer such as a polarizing plate protective film or an optical compensation member performing optical compensation, and an adhesive layer. In addition, a surface layer such as a forward scattering layer, a primer layer, an antistatic layer, and an undercoat layer may be arranged along with (or instead of) a color filter substrate, a thin layer transistor substrate, a lens film, a diffusion sheet, a hard coat layer, an anti-reflection layer, a low reflection layer, an antiglare layer, and the like.

It is preferable that the liquid crystal display device includes a backlight side polarizing plate on the surface of the liquid crystal cell on the backlight side. The backlight side polarizing plate may or may not include a polarizing plate protective film on the surface of a backlight side polarizer on the backlight side, and it is preferable that the backlight side polarizing plate includes the polarizing plate protective film on the surface of the backlight side polarizer on the backlight side.

It is preferable that the backlight side polarizing plate has a configuration in which the polarizer is interposed between two polarizing plate protective films.

Herein, a polarizing plate protective film on a side close to the liquid crystal cell with respect to the polarizer indicates an inner side polarizing plate protective film, and a polarizing plate protective film on a side separated from the liquid crystal cell with respect to the polarizer indicates an outer side polarizing plate protective film.

The backlight side polarizing plate may include a retardation film as the inner side polarizing plate protective film on the liquid crystal cell side. A known cellulose acylate film or the like is able to be used as such a retardation film.

It is preferable that the liquid crystal display device includes a display side polarizing plate on the surface of the liquid crystal cell on a side opposite to the surface on the backlight side. It is preferable that the display side polarizing plate has a configuration in which a polarizer is interposed between two polarizing plate protective films.

The liquid crystal cell, the polarizing plate, the polarizing plate protective film, and the like configuring the liquid crystal display device according to one embodiment of the present invention are not particularly limited, a member prepared by a known method or a commercially available product is able to be used without any limitation. In addition, a known interlayer such as an adhesive layer is also able to be disposed between the respective layers.

(Color Filter)

In a case where a light source having a light emission center wavelength in a wavelength range of less than or equal to 500 nm is used, various known methods are able to be used as an RGB pixel formation method. For example, a desired black matrix and a pixel pattern of R, G, and B are able to be formed on a glass substrate by using a photomask and a photoresist, and an ink composition is ejected to in a region (a concave portion surrounded by a convex portion) partitioned by a black matrix having a predetermined width and a black matrix having a width wider than that of every n-th black matrix by using a coloring ink for pixels of R, G, and B and an ink jet type printing device until a desired concentration is obtained, and thus, a color filter formed of patterns of R, Q and B is able to be prepared. After image coloring, each pixel and a black matrix may be completely cured by baking or the like.

Preferred properties of the color filter are disclosed in JP2008-083611A, and the like, and the contents thereof are incorporated in the present invention.

For example, in a wavelength at which a transmittance half of the maximum transmittance is obtained in a color filter exhibiting a green color, it is preferable that one wavelength is greater than or equal to 590 nm and less than or equal to 610 nm, and the other wavelength is greater than or equal to 470 nm and less than or equal to 500 nm. In addition, in a wavelength at which a transmittance half of the maximum transmittance is obtained in a color filter exhibiting a green color, it is preferable that one wavelength is greater than or equal to 590 nm and less than or equal to 600 nm. Further, it is preferable that the maximum transmittance in the color filter exhibiting a green color is greater than or equal to 80%. It is preferable that a wavelength at which the maximum transmittance is obtained in the color filter exhibiting a green color is greater than or equal to 530 nm and less than or equal to 560 nm.

In the color filter exhibiting a green color, it is preferable that transmittance at a wavelength of a light emission peak is less than or equal to 10% of the maximum transmittance.

In a color filter exhibiting a red color, it is preferable that a transmittance in a range of greater than or equal to 580 nm and less than or equal to 590 nm is less than or equal to 10% of the maximum transmittance.

A known pigment is able to be used as a pigment for a color filter without any limitation. Furthermore, currently, a pigment is generally used, a color filter of a dye may be used insofar as a colorant is able to control a spectrum and ensure process stability and reliability.

(Black Matrix)

It is preferable that a black matrix is arranged between the respective pixels in the liquid crystal display device. Examples of a material of forming a black stripe include a material using a sputtering film of a metal such as chromium, a light shielding photosensitive composition in which a photosensitive resin, a black coloring agent, and the like are combined, and the like. Specific examples of the black coloring agent include carbon black, titanium carbon, iron oxide, titanium oxide, graphite, and the like, and among them, the carbon black is preferable.

(Thin Layer Transistor)

The liquid crystal display device is able to further include a TFT substrate including a thin layer transistor (hereinafter, also referred to as TFT). It is preferable that the thin layer transistor includes an oxide semiconductor layer having a carrier concentration of less than $1 \times 10^{14}/cm^3$. A preferred embodiment of the thin layer transistor is disclosed in JP2011-141522A, and the contents of the publication are incorporated in the present invention.

The liquid crystal display device according to one embodiment of the present invention as described above includes the optical conversion member having a high light emission efficiency of a quantum dot, and thus, high brightness and high color reproducibility are able to be realized without using a large amount of expensive quantum dots.

EXAMPLES

Hereinafter, the characteristics of the present invention will be more specifically described with reference to examples. Materials, use amounts, ratios, treatment contents, treatment sequences, and the like of the following examples are able to be suitably changed unless the changes cause deviance from the gist of the present invention. Therefore, the range of the present invention will not be restrictively interpreted by the following specific examples.

Examples 101 to 103

Preparation Method of Anisotropic Light Scattering Film: Preparation of Anisotropic Light Scattering Layer Formed by Photocuring Acrylate 1. Preparation of Anisotropic Light Scattering Film 11

<Preparation of Anisotropic Light Scattering Film 11>

First, a photopolymerizable composition 1 (a coating liquid for an anisotropic diffusion layer) having the following compositions was applied onto a polyethylene phthalate (PET) film (Product Name: COSMOSHINE (Registered Trademark), Product Number: A4300, manufactured by TOYOBO CO., LTD.) having a thickness of 75 μm by using a doctor blade in which a gap was adjusted to be 0.2 mm, and then, was coated with another PET film (a thickness of 75 μm). The average refractive index of the used PET film was 1.60.

<<Composition of Photopolymerizable Composition 1>>

| | |
|---|---|
| 2-(Perfluorooctyl)-Ethyl Acrylate: | 50 parts by mass |
| 1,9-Nonanediol Diacrylate: | 50 parts by mass |
| 2-Hydroxy-2-Methyl-1-Phenyl Propan-1-One: | 4 parts by mass |

Next, a liquid film having a thickness of 200 μm (0.2 mm) in which both upper and lower surfaces were interposed between PET films was irradiated with an ultraviolet ray having an irradiation intensity of 30 mW/cm² for 1 minute in an oblique direction of 40 degrees from a vertical irradiation unit of a UV spot light source (Product Name: L2859-01, manufactured by Hamamatsu Photonics K.K.), and thus, an anisotropic light scattering film 11 was obtained. The film thickness of an anisotropic diffusion layer of the anisotropic light scattering film 11 is 200 μm which is identical to the thickness of the liquid film described above.

<Preparation of Anisotropic Light Scattering Film 12>

An anisotropic light scattering film 12 was obtained by the same method as that of the anisotropic light scattering film 11 except that the height of a partition wall formed by using a dispenser was 100 μm (0.1 mm). Therefore, the film thickness of an anisotropic light scattering layer of the anisotropic light scattering film 12 is 100 μm which is identical to the height of the partition wall. The same applies to the anisotropic light scattering film described below.

<Preparation of Anisotropic Light Scattering Film 13>

An anisotropic light scattering film 13 was obtained by the same method as that of the anisotropic light scattering film 11 except that an irradiation angle of UV light was 45 degrees.

2. Evaluation of Optical Diffusion Properties of Anisotropic Diffuse Sheet

Figure 8:
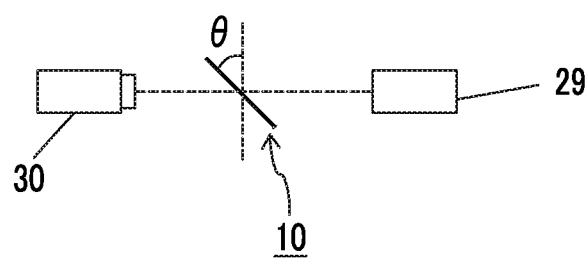
FIG. 8 illustrates a schematic view of a light intensity measurement system used in the present invention.

A light receiving section was fixed in a position receiving rectilinearly propagating light from a light source by using a goniophotometer (Product Name: GONIOPHOTOMETER GP-5, manufactured by MURAKAMI COLOR RESEARCH LABORATORY CO., Ltd.), each anisotropic light scattering film was attached to a sample holder between the light source and the light receiving section, and thus, a light intensity measurement system illustrated in FIG. 8 was obtained. First, light was emitted from a normal direction with respect to a film surface of the anisotropic light scattering film, a light intensity of the transmission light was measured, and the measured light intensity was I (0°). Next, a tilt angle of the sample with respect to an optical axis (corresponding to θ of FIG. 8) was fixed to 40°, and then, the sample was rotated, and thus, azimuthal angle dependency of a transmission light intensity was measured. At this time, the minimum value of the transmission light intensity, that is, the transmission light intensity of the anisotropic light scattering layer at an azimuth in which the transmission light intensity became the minimum value was I (40°). I (0°)/I (40°) was obtained from I (0°) and I (40°).

3. Preparation of Barrier Layer to Optical Conversion Member

When light of a blue light emitting diode was incident thereon by using a quantum dot "Lumidot (Registered Trademark)" which was manufactured by Nanoco Technologies Limited and sold by Sigma-Aldrich Japan K.K. as a quantum dot wavelength conversion element, a quantum dot sheet performing fluorescent light emission of green light having a center wavelength of 530 nm and a half-width of 40 nm and fluorescent light emission of red light having a center wavelength of 610 nm and a half-width of 40 nm was formed.

The obtained quantum dot sheet was an optical conversion layer 1.

The quantum dot sheet (the optical conversion layer 1) was bonded to each of the anisotropic light scattering films 11 to 13 prepared in 1. described above by using an acrylic adhesive in the order of the quantum dot sheet, the adhesive, and the anisotropic light scattering film from an incidence side towards an exit side. The obtained optical conversion members were optical conversion members of Examples 101 to 103.

Examples 105 and 106

4. Preparation of Barrier Layer Film

<Preparation of Anisotropic Light Scattering Film 1 with Barrier Layer>

A photopolymerizable composition 2 (a barrier layer coating liquid) described below was prepared as a coating liquid, the coating liquid was applied onto a light exit side surface of the anisotropic light scattering film 11 prepared in 1. described above by using a wire bar of a wire bar (#6), an ultraviolet ray having irradiance of 350 mW/cm² and irradiation dose of 500 mJ/cm² was emitted by using an air-cooled metal halide lamp of 160 W/cm (manufactured by EYE GRAPHICS CO., LTD.) under nitrogen purge of an oxygen concentration of less than or equal to 0.1%, and thus, an organic layer having a film thickness of approximately 500 nm was formed.

<<Composition of Photopolymerizable Composition 2>>

| | |
|---|---|
| Phosphoric Acid Ester Acrylate (KAYAMER PM-21 manufactured by Nippon Kayaku Co., Ltd.); | 10 parts by mass |
| LIGHTACRYLATE BEPG-A manufactured by Kyoeisha Chemical Co., Ltd.; | 90 parts by mass |
| Photopolymerization initiator [IRGACURE907 manufactured by BASF SE]; | 6 parts by mass |

Further, an inorganic layer formed of silicon oxide was formed on the organic layer. The inorganic layer was formed by using a sputtering device and by using Si as a target, argon as discharge gas, and oxygen as a reaction gas. The thickness of the inorganic layer film was 50 nm, and thus, a barrier layer film 1 was obtained.

5. Preparation of Optical Conversion Member with Barrier Layer

The barrier film, an adhesive, the quantum dot sheet, an adhesive, and the anisotropic light scattering film with a barrier layer were bonded to each other in this order from the incidence side towards the exit side by using the barrier film 1 and an acrylic adhesive. Furthermore, a barrier layer surface of the anisotropic light scattering film with a barrier layer was bonded towards the quantum dot sheet side. The obtained optical conversion member was an optical conversion member of Example 105. Furthermore, even though the data of a light extraction efficiency is not shown in Table 1 or Table 2 described below, a light extraction efficiency of the optical conversion member of Example 105 is improved compared to Comparative Example 104 described below.

In addition to the configuration described above, the barrier film, the adhesive, the quantum dot sheet, the adhesive, the anisotropic light scattering sheet, the adhesive, and the barrier film were bonded to each other in this order from the incidence side towards the exit side. The obtained optical conversion member was an optical conversion member of Example 106. Furthermore, even though the data of a light extraction efficiency is not shown in Table 1 or Table 2 described below, a light extraction efficiency of the optical conversion member of Example 106 is improved compared to Comparative Example 104 described below.

Comparative Example 104

Example of Using Isotropic Light Scattering Film

In the preparation of the optical conversion member, an isotropic light scattering film and the optical conversion layer 1 were laminated by the same method as that in Examples 1 to 3 described above except that "SUMIPEX RM400" manufactured by Sumitomo Chemical Company, Limited was used as the isotropic light scattering film instead of the anisotropic light scattering film 11, and thus, an optical conversion member 104 was prepared. As illustrated in FIG. 5, a light distribution of "SUMIPEX RM400" was a monotonous convex distribution in which the normal direction of the sheet was maximized.

The obtained optical conversion member 104 was an optical conversion member of Comparative Example 104.

Example 107

Preparation Method of Anisotropic Light Scattering Film 17: Preparation of Anisotropic Light Scattering Layer Using Liquid Crystal Coating <Preparation of Anisotropic Light Scattering Film 17>
<<Preparation of Transparent Support a with Pattern Alignment Film>>

A composition for a pattern alignment film described below was prepared, and then, was filtered by a polypropylene filter having a hole diameter of 0.2 μm, and thus, a coating liquid for a pattern alignment film was prepared. The coating liquid was applied onto the surface of a triacetyl cellulose film (TAC-TD80UL, manufactured by Fujifilm Corporation) with a bar (#14), and was dried at 100° C. for 1 minute. Next, a stripe mask was arranged on an alignment film such that the stripe was parallel to a transport direction, and was irradiated with an ultraviolet ray for 2 seconds by using an air-cooled metal halide lamp (manufactured by EYE GRAPHICS CO., LTD.) having irradiance of 50 mW/cm² at 365 nm in the air, a photoacid generator was decomposed, and an acidic compound was generated, and thus, an alignment film was formed. At this time, exposure was performed by using a stripe mask in which a stripe width of a transmission portion was 1 μm, and a stripe width of a shielding portion was 1 μm. After the mask exposure, one reciprocating rubbing treatment was performed at 1000 rpm and an angle of 45 degrees with respect to the transport direction of the film. Furthermore, the film thickness of the pattern alignment film was 0.5 μm.

<<Composition for Pattern Alignment Film>>

| | |
|---|---|
| Polymer Material (PVA103, Polyvinyl Alcohol manufactured by KURARAY CO., LTD) | 2.4 parts by mass |
| Photoacid Generator (S-5) | 0.11 parts by mass |
| Methanol | 16.7 parts by mass |
| Isopropanol | 7.4 parts by mass |
| Water | 73.4 parts by mass |

Photoacid Generator (S-5)

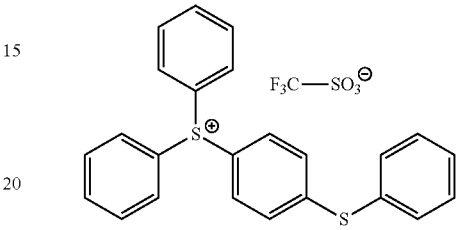

<<Preparation of Anisotropic Light Scattering Film 17>>

A composition for liquid crystal compound layer described below was prepared, and then, was filtered by a polypropylene filter having a hole diameter of 0.2 μm, and thus, was used as a coating liquid. The coating liquid was applied onto a triacetyl cellulose film with a pattern alignment film (TAC-TD80UL, manufactured by Fujifilm Corporation) with a bar (#3), and was dried at a film surface temperature of 105° C. for 2 minutes to be in a liquid crystalline phase state, and then, was cooled to 75° C., and was irradiated with an ultraviolet ray by using an air-cooled metal halide lamp (manufactured by EYE GRAPHICS CO., LTD.) of 160 W/cm² in the air, and the alignment state thereof was immobilized, and thus, an anisotropic light scattering film 17 was prepared.

| Composition for Liquid Crystal Compound Layer | |
|---|---|
| Rod-Like Liquid Crystal Compound (LC242, manufactured by BASF SE) | 100 parts by mass |
| Vertical Alignment Agent A | 0.5 parts by mass |
| Vertical Alignment Agent B | 1.0 parts by mass |
| Photopolymerization Initiator (IRGACURE907, manufactured by BASF SE) | 3.3 parts by mass |
| Sensitizer (KAYACURE-DETX, manufactured by Nippon Kayaku Co., Ltd.) | 1.1 parts by mass |
| Methyl Ethyl Ketone | 3000 parts by mass |

Rod-Like Liquid Crystal Compound LC242

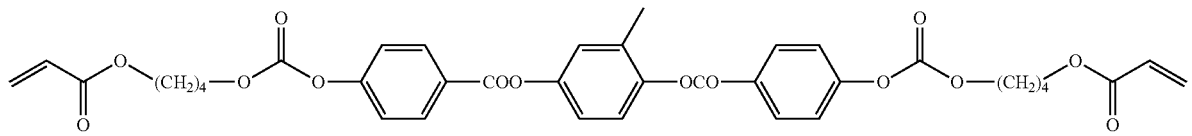

Vertical Alignment Agent A

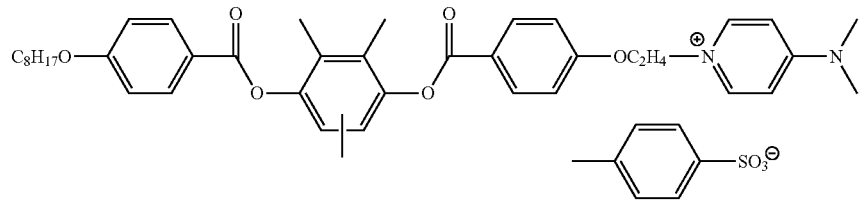

Vertical Alignment Agent B

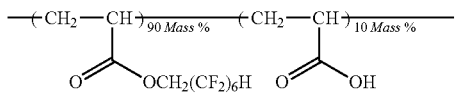

<<Evaluation of Shape>>

As a result of analyzing the shape of an exposed portion and an unexposed portion of the formed anisotropic light scattering film 17 by VertScan2.0 (manufactured by Ryoka Systems Inc.), in the liquid crystal compound layer in the exposed portion, the thickness was 0.17 μm and the pitch was 1.6 μm, and in the unexposed portion, the thickness was approximately 0 μm.

<<Evaluation of Optical Performance>>

Next, an alignment state of the rod-like liquid crystal compound in the liquid crystal compound layer, a direction of a slow axis, and Re and Rth were respectively measured by using KOBRA-21ADH (manufactured by Oji Scientific Instruments Co., Ltd.) according to a method described in [0127] herein (measurement of a tilt angle using KOBRA). It can be understood that Re (550) is 0 nm, Rth (550) is 9 nm, and the rod-like liquid crystal compound is aligned on the pattern alignment film in the presence of two types of vertical alignment agents, and thus, a pattern liquid crystal compound layer is obtained in which the rod-like liquid crystal compound in the exposed portion is vertically aligned (the tilt of the director is 0°) with respect to the alignment film surface.

<Preparation of Optical Conversion Member>

The obtained anisotropic light scattering film 17 was bonded to the optical conversion layer 1 by using an acrylic adhesive, and thus, an optical conversion member of Example 107 was obtained.

Example 108

Preparation of Transparent Support with Pattern Alignment Film

A photocross-linkable polymer described below was used. Commercially available polyvinyl cinnamate (manufactured by Sigma-Aldrich Japan K.K.) was reprecipitated in methanol two times. Polymethacrylate having cinnamoyl on a side chain was prepared by performing radical polymerization with respect to a methacrylate monomer of n-propyl-2-(4-methacryloxy phenyl) ethynyl-carboxylate (MOCinPr). The radical polymerization of the monomer was performed in a solution of 10 mass % by the following method.

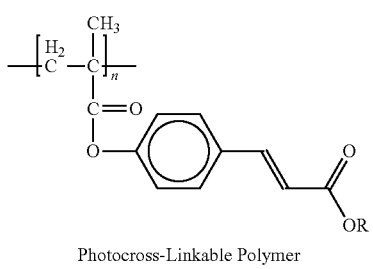

Photocross-Linkable Polymer

R is an n-propyl group (—$C_3H_8$).

The followings were dissolved in 10 mL of dried benzene, and were put into an ampule, freezing and thawing were repeated, and degassing was performed.

| | |
|---|---|
| Monomer | 1.0 g |
| Polymerization Initiator (Azobisisobutyronitrile) | 10 mg |

In order to separate the polymer, the ampule was covered with a lid and was retained at 60° C. for 10 hours, and then, the obtained solution was injected into methanol, and thus, reprecipitation occurred in methanol. This procedure was repeated, and thus, the polymer was purified. Finally, the polymer was placed at room temperature for 6 hours in vacuum, and was dried. As a result of measuring thermal properties of the polymer by using a differential scanning calorimeter (DSC200 manufactured by Seiko Instruments Inc.), a heating speed was ±10° C./minute.

<<Formation of Pattern Photoalignment Film>>

A solution of 1.5 mass % in which monochlorobenzene and methylene chloride were mixed at a ratio of 1 to 1 was applied onto a triacetyl cellulose film (TAC-TD80UL, manufactured by Fujifilm Corporation) by spin coating, and thus, a photocross-linkable polymer thin film having a thickness of approximately 60 nm was obtained. Non-polarized light at a wavelength of 313 nm was emitted from an oblique direction of +40° with respect to the normal direction of the transparent support through a stripe-like mask having an opening of 0.8 μm at a pitch of 1.6 μm. After that, the mask was shifted by 0.8 μm in a longitudinal direction and a vertical direction of the stripe, and non-polarized light at a wavelength of 313 nm was emitted from an oblique direction of −40° with respect to the normal direction of the transparent support. Light at 313 nm was generated by allowing exit light of a Hg—Xe lamp of 150 W (San-ei Electric Mfg. Co. Ltd., UV Supercure-230S) to pass through a solution filter in which $K_2CrO_4$ was dissolved in NaOH and a bandpass filter (UV-D35 manufactured by TOSHIBA CORPORATION).

<<Formation of Liquid Crystal Compound Layer>>

Subsequently, 20 mass % of a polymerizable disk-like liquid crystal compound solution described below which contained 0.5 mass % of a photoinitiator and was dissolved in a 4-methyl-2-pentanone solution was applied onto the thin film which had been subjected to the light irradiation by spin coating, and was heated, and thus, was changed to a disk-like nematic phase, DLC molecules were aligned, and then, UV light irradiation was performed such that the disk-like liquid crystal (DLC) molecules were photopolymerized.

The support with a liquid crystal compound layer obtained as described above was an anisotropic light scattering film 18.

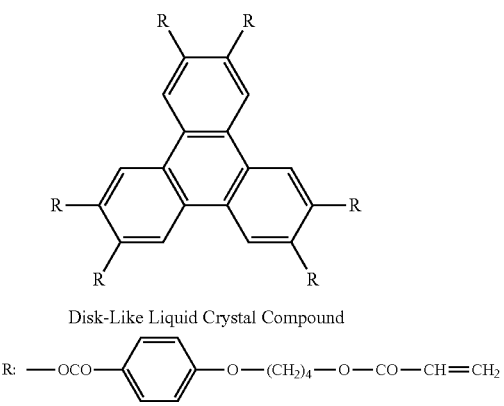

Disk-Like Liquid Crystal Compound

R: —OCO—⟨⟩—O—(CH₂)₄—O—CO—CH=CH₂

<<Evaluation of Properties>>

The anisotropic light scattering film 18 was cut in a direction vertical to the film surface by a microtome (manufactured by Leica Camera AG), and the sectional surface was observed by a polarizing microscope. When a direction tilted by ±40° with respect to the normal direction of the film surface was aligned with an axis of a crossed nicol polarizing plate of the polarizing microscope, a dart portion having a width of 0.8 μm appeared at a pitch of 1.6 μm, and the thickness thereof was approximately 2.65 μm. From this, it was found that in the liquid crystal compound layer aligned in a direction of ±40° with respect to the normal direction of the film surface, the thickness was 2.65 μm and the pitch was 1.6 μm.

<Preparation of Optical Conversion Member Including Anisotropic Light Scattering Layer and Optical Conversion Layer>

The obtained anisotropic light scattering film 18 was bonded to the optical conversion layer 1 by using an acrylic adhesive, and thus, an optical conversion member of Example 108 was obtained.

Comparative Example 201

When light of a blue light emitting diode was incident thereon by using a quantum dot "Lumidot (Registered Trademark)" which was manufactured by Nanoco Technologies Limited and sold by Sigma-Aldrich Japan K.K. and styrene particles (SX-350HMR, a particle diameter of 3.5 μm, manufactured by Soken Chemical & Engineering Co., Ltd.) as a quantum dot wavelength conversion element, a isotropic light scattering quantum dot sheet performing fluorescent light emission of green light having a center wavelength of 530 nm and a half-width of 40 nm and fluorescent light emission of red light having a center wavelength of 610 nm and a half-width of 40 nm was formed.

The obtained isotropic light scattering quantum dot sheet was an optical conversion member of Comparative Example 201.

Example 202

Preparation of Anisotropic Light Scattering Film Containing Quantum Dot

An anisotropic light scattering film 202 was obtained by the same method as that of the anisotropic light scattering film 11 except that a quantum dot emitting red light and a quantum dot emitting green light (a quantum dot "Lumidot" manufactured by Nanoco Technologies Limited and sold by Sigma-Aldrich Japan K.K) were added to the photopolymerizable composition 1.

The obtained anisotropic light scattering film 202 containing the quantum dot was an optical conversion member of Example 202.

Example 203

In Example 202, a light scattering film 23 was obtained by the same manufacturing method of the anisotropic light scattering film 11 except that the irradiation angle of the UV light was changed to 45 degrees.

The obtained anisotropic light scattering film 23 containing the quantum dot was an optical conversion member of Example 203.

Examples 204 and 205

In Example 202, light scattering films 24 and 25 were obtained by the same manufacturing method of the anisotropic light scattering film 11 except that the film thickness was changed to 300 μm and 400 μm.

The obtained anisotropic light scattering films 24 and 25 containing the quantum dot were each optical conversion members of Examples 204 and 205.

Example 206

A light scattering film 26 was obtained by the same method as that in Example 204 except that the substrate coated with the photopolymerizable composition 1 was changed to the barrier film 1. The obtained anisotropic light scattering film 26 containing the quantum dot was an optical conversion member of Example 206.

[Evaluation]

(I(0°)/I(40°))

In the anisotropic light scattering of the optical conversion members of Examples 202 to 206 and Comparative Example 201, I (0°) and I (40°) were measured by a goniometer, and a ratio I (0°)/I (40°) of the values were evaluation values.

The obtained results were shown in Table 1 or Table 2 described below.

(Increase in Light Extraction Efficiency)

In the optical conversion members of each of the examples and the comparative examples, a light extraction efficiency was measured by the following method.

The optical conversion member was disposed on a commercially available blue plane light source (Center Wavelength of Light Emission Spectrum: 465 nm), exit light was measured by using a view angle measurement device (Ez-Contrast, manufactured by ELDIM S.A.), and an integrated value of brightness values at each azimuthal angle and each polar angle was a brightness value of the optical conversion member.

In each of the examples, an increase in brightness with respect to each of the comparative examples shown in Table 1 or Table 2 described below was obtained on the basis of the obtained results, and the obtained increase was an increase in the light extraction efficiency of the optical conversion member.

The obtained results were shown in Table 1 or Table 2 described below.

TABLE 1

Figure 2:
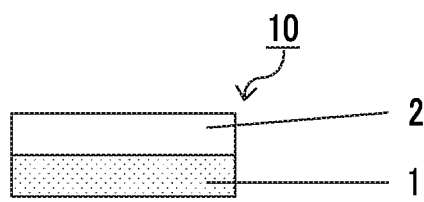
FIG. 2 illustrates an example of an optical conversion member for comparison using an isotropic light scattering layer.

|  |  |  | Example 101 | Example 102 | Example 103 | Comparative Example 104 | Example 107 | Example 108 |
|---|---|---|---|---|---|---|---|---|
| Optical Conversion Member | Light Scattering Layer | Name | Anisotropic Light Scattering Film 11 | Anisotropic Light Scattering Film 12 | Anisotropic Light Scattering Film 13 | Isotropic Light Scattering Film (SUMIPEX RM400) | Anisotropic Light Scattering Film 17 | Anisotropic Light Scattering Film 18 |
|  |  | Configuration | Acrylate | Acrylate | Acrylate | Acrylate | Rod-Like Liquid Crystal | Discotic Liquid Crystal |
|  |  | Embodiment | FIG. 3 | FIG. 3 | FIG. 3 | FIG. 2 | FIG. 3 | FIG. 3 |
|  |  | Half-Width [°] | 50 | 50 | 70 | 120 | 90 | 90 |
|  |  | I(0°)/I(40°) | 20 | 10 | 20 | 2 | 4 | 4 |
|  |  | Film Thickness [μm] | 200 | 100 | 200 | 200 | 200 | 200 |
|  | Optical Conversion Layer | Name | Optical Conversion Layer 1 | Optical Conversion Layer 1 | Optical Conversion Layer 1 | Optical Conversion Layer 1 | Optical Conversion Layer 1 | Optical Conversion Layer 1 |
|  |  | Quantum Dot | R, G | R, G | R, G | R, G | R, G | R, G |
| Evaluation | Increase in Light Extraction Efficiency [%] |  | 10% (with respect to Comparative Example 104) | 6% (with respect to Comparative Example 104) | 8% (with respect to Comparative Example 104) | — | 2% (with respect to Comparative Example 104) | 2% (with respect to Comparative Example 104) |

TABLE 2

Figure 4:
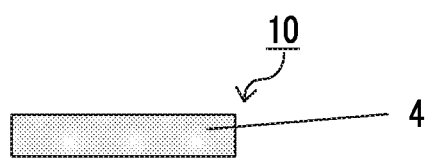
FIG. 4 illustrates an example of the optical conversion member according to one embodiment of the present invention.

|  |  |  | Comparative Example 201 | Example 202 | Example 203 | Example 204 | Example 205 | Example 206 |
|---|---|---|---|---|---|---|---|---|
| Optical Conversion Member | Light Scattering Layer Containing Quantum Dot | Name | Isotropic Light Scattering Film 21 | Anisotropic Light Scattering Film 22 | Anisotropic Light Scattering Film 23 | Anisotropic Light Scattering Film 24 | Anisotropic Light Scattering Film 25 | Anisotropic Light Scattering Film 26 |
|  |  | Configuration | Acrylate | Acrylate | Acrylate | Acrylate | Acrylate | Acrylate |
|  |  | Embodiment | FIG. 4 | FIG. 4 | FIG. 4 | FIG. 4 | FIG. 4 | FIG. 11 |
|  |  | Half-Width [°] | 120 | 50 | 70 | 50 | 50 | 50 |
|  |  | I(0°)/I(40°) | 2 | 20 | 20 | 30 | 40 | 30 |
|  |  | Film Thickness [μm] | 200 | 200 | 200 | 300 | 400 | 300 |
|  |  | Quantum Dot | R, G | R, G | R, G | R, G | R, G | R, G |
| Evaluation | Increase in Light Extraction Efficiency [%] |  | — | 10% (with respect to Comparative Example 201) | 8% (with respect to Comparative Example 201) | 12% (with respect to Comparative Example 201) | 13% (with respect to Comparative Example 201) | 12% (with respect to Comparative Example 201) |

From Table 1 or Table 2 described above, it was found that the optical conversion member of the present invention had a high light extraction efficiency.

In contrast, the optical conversion members of Comparative Example 104 and Comparative Example 201 in which I (0°)/I (40°) was lower than the lower limit value defined in the present invention had a low light extraction efficiency.

Examples 301 to 303, Comparative Example 304, and Examples 305 to 308

In Examples 101 to 103, Comparative Example 104, and Examples 105 to 108, when light of a blue light emitting diode was incident thereon by using a quantum dot "Lumidot (Registered Trademark)" which was manufactured by Nanoco Technologies Limited and sold by Sigma-Aldrich Japan K.K. was used instead of the optical conversion layer 1, a quantum dot sheet emitting green light having a center wavelength of 530 nm and a half-width of 40 nm and a quantum dot sheet emitting red light having a center wavelength of 610 nm and a half-width of 40 nm were respectively prepared, and optical conversion members were respectively manufactured by using a quantum dot laminated film (an optical conversion layer 2) in which the quantum dot sheets were laminated by an acrylic adhesive.

The obtained optical conversion members were respectively optical conversion members of Examples 301 to 303, Comparative Example 304, and Examples 305 to 308.

The optical conversion members of each of Examples 301 to 303 and Examples 305 to 308 using the optical conversion layer 2 had an excellent light extraction efficiency compared to Comparative Example 304, and had the same tendency as that of Examples 101 to 103, Comparative Example 104, and Examples 105 to 108.

INDUSTRIAL APPLICABILITY

The present invention is useful in the manufacturing field of a liquid crystal display device.

EXPLANATION OF REFERENCES

1: optical conversion layer
2: isotropic light scattering layer
3: anisotropic light scattering layer
4: anisotropic light scattering layer containing quantum dot
5: quantum dot emitting red light
6: quantum dot emitting green light
7: layer containing quantum dot emitting red light 8: layer containing quantum dot emitting green light
10: optical conversion member
α: half-width
θ: tilt angle
I: relative light transmission intensity
$I_a$: light transmission intensity (absolute light transmission intensity)
A: azimuth in which light transmission intensity is minimized
B: azimuth in which light transmission intensity is not minimized
21: relationship between tilt angle θ in anisotropic light scattering layer in which I (0°)/I (40°) is 3 and half-width is 90° and relative light intensity I
22: relationship between tilt angle θ in anisotropic light scattering layer in which I (0°)/I (40°) is 3 and half-width is 70° and relative light intensity I
23: relationship between tilt angle θ in anisotropic light scattering layer in which I (0°)/I (40°) is 3 and half-width is 50° and relative light intensity I
24: relationship between tilt angle θ in anisotropic light scattering layer in which I (0°)/I (40°) is 3 and half-width is 50° and relative light intensity I
25: relationship between tilt angle θ in anisotropic light scattering layer in which I (0°)/I (40°) is 10 and half-width is 50° and relative light intensity I
29: light source for measuring brightness
30: brightness meter
31: backlight unit
31A: light source
31B: light guide plate
31C: optical conversion member
32: blue light
33: green light
34: red light
35A, 35B: barrier film (barrier layer)

What is claimed is:

1. An optical conversion member, comprising:
an optical conversion layer containing at least one type of quantum dot emitting fluorescent light which is excited by incident excitation light; and
an anisotropic light scattering layer having I (0°)/I (40°) of greater than or equal to 3,
wherein I (0°) indicates a transmission light intensity of the anisotropic light scattering layer at the time of allowing light to be incident on the anisotropic light scattering layer from a normal direction of a surface of the anisotropic light scattering layer,
wherein I (40°) indicates a transmission light intensity of the anisotropic light scattering layer in an azimuth in which a transmission light intensity of the anisotropic light scattering layer at the time of allowing light to be incident on the anisotropic light scattering layer from a direction of a tilt angle of 40° with respect to the normal direction of the surface of the anisotropic light scattering layer becomes a minimum value,
wherein the anisotropic light scattering layer is a liquid crystal compound layer using a rod-like liquid crystal compound,
wherein a concave and convex portion is formed on the anisotropic light scattering layer, and
wherein a tilt angle θ of a director of the rod-like liquid crystal compound is less than or equal to ±10° from the normal direction of the surface of the liquid crystal compound layer in an alignment state.

2. The optical conversion member according to claim 1, wherein the optical conversion layer is a layer containing a quantum dot emitting green light and a quantum dot emitting red light.

3. The optical conversion member according to claim 1, wherein the optical conversion layer is a laminate which includes at least a layer containing a quantum dot emitting green light and a layer containing a quantum dot emitting red light, and
the layer containing the quantum dot emitting red light, the layer containing the quantum dot emitting green light, and the anisotropic light scattering layer are laminated in this order.

4. The optical conversion member according to claim 1, wherein the anisotropic light scattering layer is formed by curing a composition containing a photocurable compound by light irradiation from an azimuth of greater than 0° and less than or equal to 60° from the normal direction of the surface of the anisotropic light scattering layer.

5. The optical conversion member according to claim 1, wherein the anisotropic light scattering layer is formed by curing a composition containing a polymerizable liquid crystal compound by light irradiation.

6. The optical conversion member according to claim 1, wherein I (0°)/I (40°) of the anisotropic light scattering layer is greater than or equal to 5,
I (0°) indicates a transmission light intensity of the anisotropic light scattering layer at the time of allowing light to be incident on the anisotropic light scattering layer from a normal direction of a surface of the anisotropic light scattering layer, and
I (40°) indicates a transmission light intensity of the anisotropic light scattering layer in an azimuth in which a transmission light intensity of the anisotropic light scattering layer at the time of allowing light to be incident on the anisotropic light scattering layer from a direction of a tilt angle of 40° with respect to the normal direction of the surface of the anisotropic light scattering layer becomes a minimum value.

7. The optical conversion member according to claim 1, wherein I (0°)/I (40°) of the anisotropic light scattering layer is greater than or equal to 20,
I (0°) indicates a transmission light intensity of the anisotropic light scattering layer at the time of allowing light to be incident on the anisotropic light scattering layer from a normal direction of a surface of the anisotropic light scattering layer, and
I (40°) indicates a transmission light intensity of the anisotropic light scattering layer in an azimuth in which a transmission light intensity of the anisotropic light scattering layer at the time of allowing light to be incident on the anisotropic light scattering layer from a direction of a tilt angle of 40° with respect to the normal direction of the surface of the anisotropic light scattering layer becomes a minimum value.

8. A backlight unit, comprising:
the optical conversion member according to claim 1; and
a light source.

9. A liquid crystal display device, comprising:
the backlight unit according to claim 8.

10. A method for manufacturing the optical conversion member according to claim 1, comprising:
forming the anisotropic light scattering layer by performing photocuring in which a curable compound is subjected to light irradiation.

11. The method for manufacturing the optical conversion member according to claim 10,
wherein the forming the anisotropic light scattering layer by the photocuring is performing light irradiation with respect to a composition containing a photocurable compound from an azimuth of greater than 0° and less than or equal to 60° from a normal direction of a surface of the anisotropic light scattering layer.

12. The method for manufacturing the optical conversion member according to claim 10,
wherein the forming the anisotropic light scattering layer by the photocuring is performing light irradiation with respect to a composition containing a polymerizable liquid crystal compound.

13. The optical conversion member according to claim 1,
wherein I (0°)/I (40°) of the anisotropic light scattering layer is measured by the following light intensity measurement system:
a light receiving section is fixed in a position receiving rectilinearly propagating light from a light source to measure a light intensity of the transmission light through the anisotropic light scattering layer and the anisotropic light scattering layer is between the light source and the light receiving section.

14. An optical conversion member, comprising:
an anisotropic light scattering layer having I (0°)/I (40°) of greater than or equal to 3,
wherein the anisotropic light scattering layer contains at least one type of quantum dot emitting fluorescent light which is excited by incident excitation light,
wherein I (0°) indicates a transmission light intensity of the anisotropic light scattering layer at the time of allowing light to be incident on the anisotropic light scattering layer from a normal direction of a surface of the anisotropic light scattering layer,
wherein I (40°) indicates a transmission light intensity of the anisotropic light scattering layer in an azimuth in which a transmission light intensity of the anisotropic light scattering layer at the time of allowing light to be incident on the anisotropic light scattering layer from a direction of a tilt angle of 40° with respect to the normal direction of the surface of the anisotropic light scattering layer becomes a minimum value,
wherein the anisotropic light scattering layer is a liquid crystal compound layer using a rod-like liquid crystal compound,
wherein a concave and convex portion is formed on the anisotropic light scattering layer, and
wherein a tilt angle θ of a director of the rod-like liquid crystal compound is less than or equal to ±10° from the normal direction of the surface of the liquid crystal compound layer in an alignment state.

15. The optical conversion member according to claim 14,
wherein the optical conversion member contains at least a quantum dot emitting green light and a quantum dot emitting red light as the quantum dot.

16. The optical conversion member according to claim 14,
wherein the anisotropic light scattering layer is a layer formed by curing a composition containing a photocurable compound by light irradiation from an azimuth of greater than 0° and less than or equal to 60° from the normal direction of the surface of the anisotropic light scattering layer.

17. The optical conversion member according to claim 14,
wherein the I (0°)/I (40°) is greater than or equal to 5.

18. The optical conversion member according to claim 14,
wherein the I (0°)/I (40°) is greater than or equal to 20.

19. A backlight unit comprising the optical conversion member according to claim 14 and a light source.

20. A liquid crystal display device comprising the backlight unit according to claim 19.

* * * * *